US008009877B2

(12) United States Patent
Nakada et al.

(10) Patent No.: US 8,009,877 B2
(45) Date of Patent: Aug. 30, 2011

(54) STORAGE MEDIUM STORING AN INFORMATION PROCESSING PROGRAM, INFORMATION PROCESSING APPARATUS AND INFORMATION PROCESSING METHOD

(75) Inventors: Ryuichi Nakada, Kyoto (JP); Takeshi Ando, Kyoto (JP); Masayuki Taira, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 987 days.

(21) Appl. No.: 11/907,654

(22) Filed: Oct. 16, 2007

(65) Prior Publication Data

US 2008/0317385 A1 Dec. 25, 2008

(30) Foreign Application Priority Data

Jun. 22, 2007 (JP) ................................. 2007-164483

(51) Int. Cl.
*G06K 9/00* (2006.01)
(52) U.S. Cl. ........................ 382/117; 382/118
(58) Field of Classification Search .......... 382/117–118, 382/209, 218, 224
See application file for complete search history.

(56) References Cited

U.S. PATENT DOCUMENTS

| | | | | |
|---|---|---|---|---|
| 5,508,191 A * | 4/1996 | Kanegae et al. | ........... | 435/252.2 |
| 5,517,021 A * | 5/1996 | Kaufman et al. | ............. | 250/221 |
| 6,091,334 A * | 7/2000 | Galiana et al. | ................ | 340/576 |
| 7,043,056 B2 * | 5/2006 | Edwards et al. | .............. | 382/103 |
| 7,209,574 B2 * | 4/2007 | Tafuku et al. | ................. | 382/103 |
| 7,319,778 B2 * | 1/2008 | Ono | .............................. | 382/118 |
| 2005/0219377 A1 | 10/2005 | Yamada et al. | | |
| 2006/0160616 A1 | 7/2006 | Kato et al. | | |
| 2006/0210121 A1 | 9/2006 | Nakano et al. | | |
| 2008/0193020 A1* | 8/2008 | Sibiryakov et al. | ........... | 382/209 |

FOREIGN PATENT DOCUMENTS

JP 6-227278 8/1994

OTHER PUBLICATIONS

Shaw, et al. "The Eye Wink Control Interface: Using the Computer to Provide the severely Disabled with Increased Flexibility and Comfort", pp. 105-111, IEEE, 1990.*
Sciencedaily "Eye-Controlled Computer Operation", p. 1, Sciencedaily.com, Sep. 27, 2006.*
Tinn et al. "Dual-State Parametric Eye Tracking", Automatic Face and Gesture Recognition, 2000. Fourth IEEE International Conference, Grenoble, France, Mar. 2000, Los Alamitos, CA, USA IEEE Comput. Soc., US, pp. 110-115.

* cited by examiner

*Primary Examiner* — Daniel Mariam
(74) *Attorney, Agent, or Firm* — Nixon & Vanderhye P.C.

(57) ABSTRACT

A game apparatus includes a camera cartridge, and detects a plurality of feature points from a facial image of a user photographed by the camera cartridge. The game apparatus calculates areas of black eye regions of a left eye and a right eye by utilizing the plurality of feature points. Then, the game apparatus detects whether or not any one of the left eye and the right eye is closed on the basis of the calculated areas. The game apparatus executes game processing according to the detection result.

26 Claims, 22 Drawing Sheets

FIG. 5
(A)
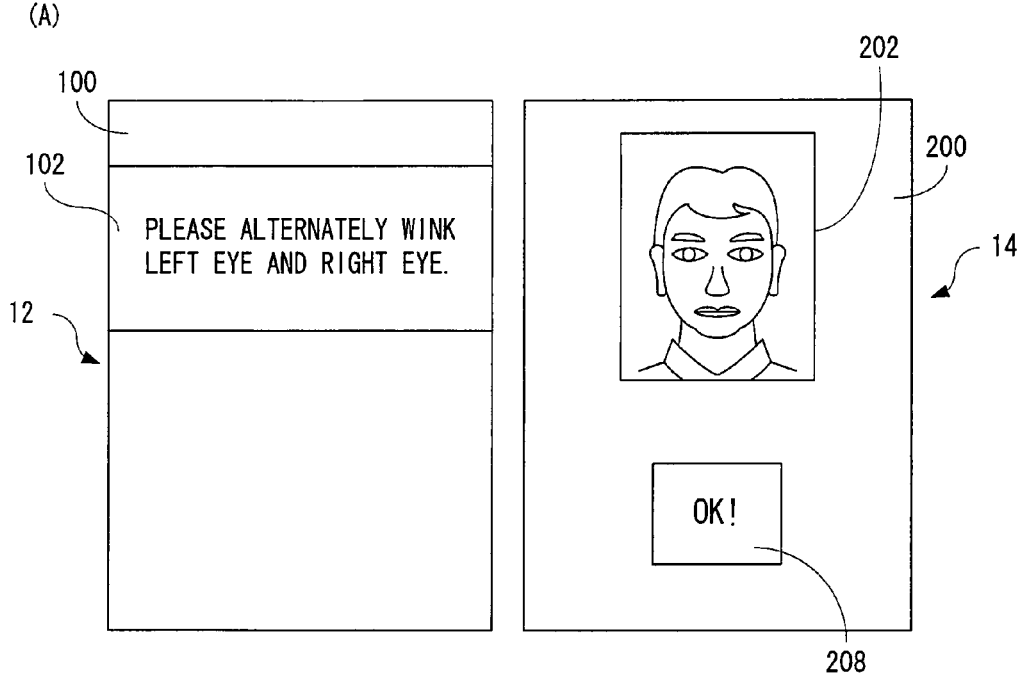
(B)
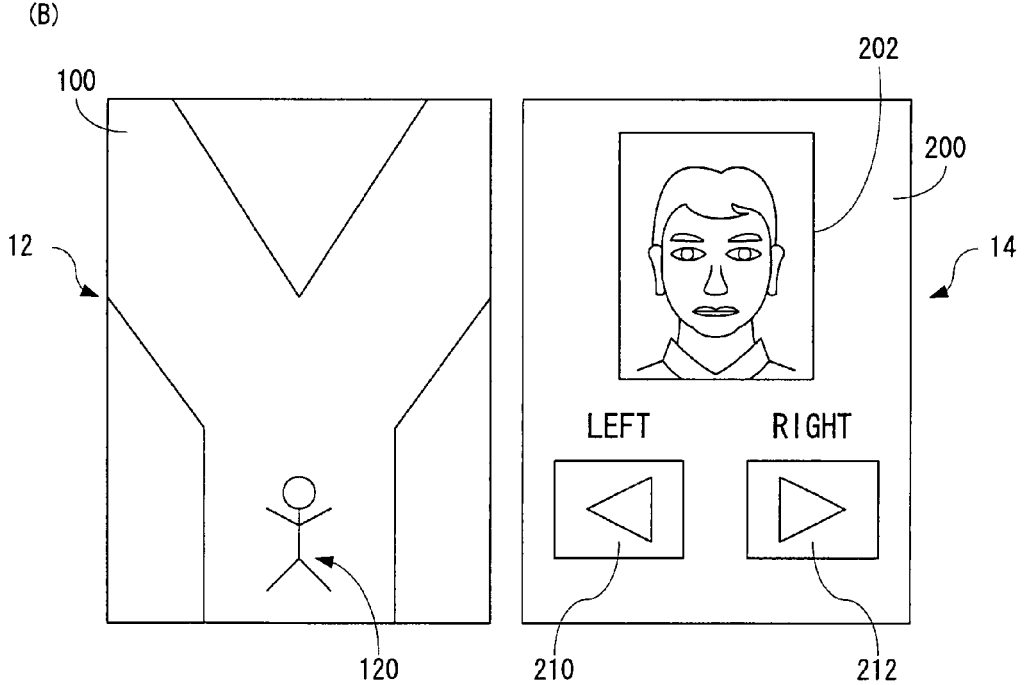

FIG. 22
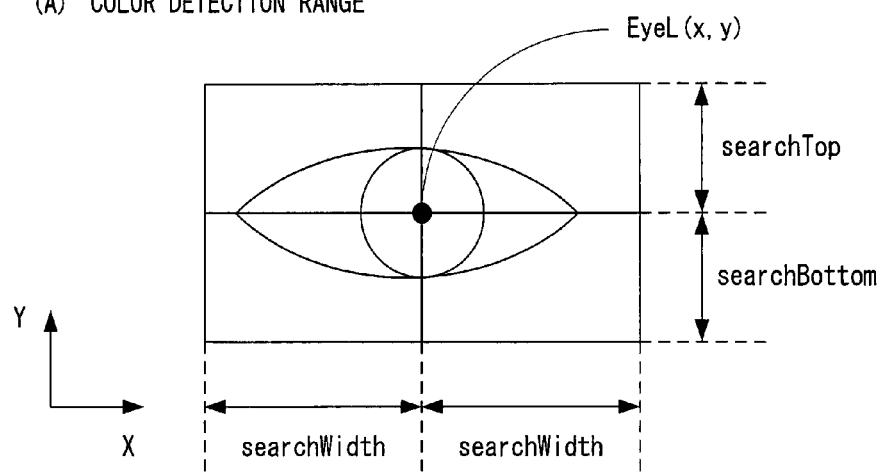
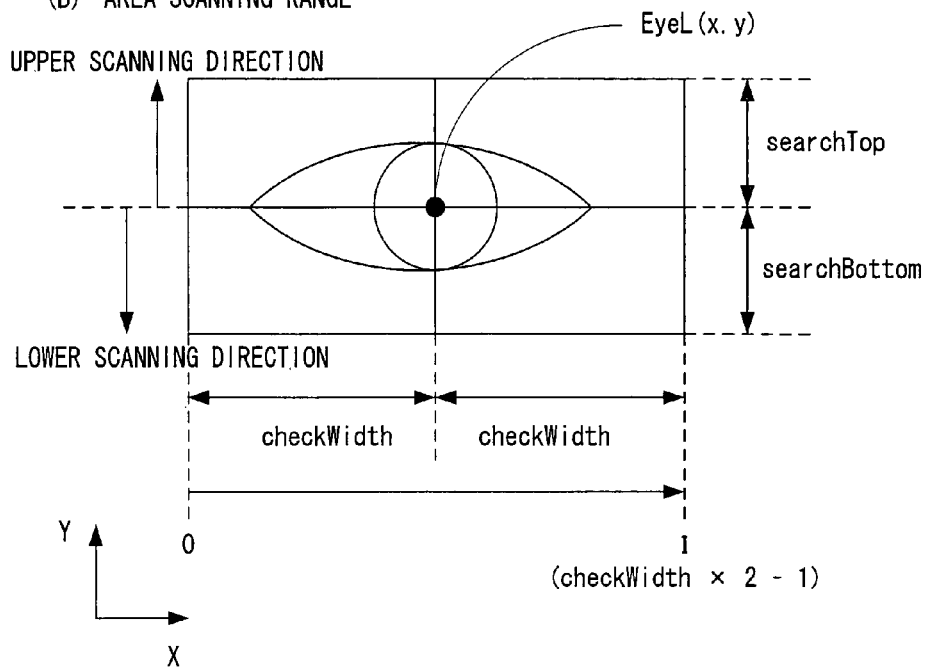

STORAGE MEDIUM STORING AN INFORMATION PROCESSING PROGRAM, INFORMATION PROCESSING APPARATUS AND INFORMATION PROCESSING METHOD

CROSS REFERENCE OF RELATED APPLICATION

The disclosure of Japanese Patent Application No. 2007-164483 is incorporated herein by reference.

BACKGROUND

1. Field of the Technology

The technology presented herein relates to a storage medium storing an information processing program, an information processing apparatus and an information processing method. More specifically, the present technology relates to a storage medium storing an information processing program, an information processing apparatus and an information processing method having a photographing means, and acquiring a facial image of a user by the photographing means.

2. Description of the Related Art

One example of a related art is disclosed in Japanese Patent Laid-open No. 6-227278 [B60K 28/10, G08B 21/00] laid-open on Aug. 16, 1994. As to a driver state detecting apparatus of the related art, an input facial image of a driver is binarized, and where eyeballs exists within the binarized image is determined. Then, the eyeball existing area is scanned to detect successive black pixels, and according to the setting of a determination reference whether or not a black eye part exists, opening or closing the eyes are detected.

However, in the related art, opening and closing the eyes can be detected, but a motion of closing only one eye cannot be detected.

SUMMARY OF THE INVENTION

Therefore, it is a primary feature of an example embodiment presented herein to provide a novel storage medium storing an information processing program, information processing apparatus, and information processing method.

Another feature of the present embodiment is to provide a storage medium storing an information processing program, an information processing apparatus and an information processing method capable of detecting a motion of closing only the one eye.

The present embodiment employs following features in order to solve the above-described problems. It should be noted that reference numerals inside the parentheses and supplement show one example of a correspondence with the embodiments described later for easy understanding, and do not limit the present embodiment.

A first embodiment is a storage medium storing an information processing program executed by a computer of an information processing apparatus having a photographing means, and capturing a facial image of a user by the photographing means, and the information processing program causes the computer to execute an eye region value calculating step for calculating respective eye region values indicating sizes of regions of right and left eyes from the facial image of the user photographed by the photographing means, and an one eye determining step for determining whether or not one eye is closed by comparing the eye region values with respect to the right and left eyes calculated by the eye region value calculating step.

In the first embodiment, the information processing program is executed by a computer of an information processing apparatus (10). The information processing apparatus has a photographing means (60), and a facial image of a user is captured by the photographing means. An eye region value calculating step (34, S13) calculates respective eye region values indicating sizes of regions of right and left eyes (black eye region, white eye region, the both regions, or the like) from the facial image of the user photographed by the photographing means. A one eye determining step (34, S19, S23) determines whether or not one eye is closed by comparing the eye region values with respect to the right and left eyes calculated by the eye region value calculating step.

According to the first embodiment, the right and left eye region values are compared, and therefore, it is possible to determine whether or not one eye is closed.

In a second embodiment one eye determining step determines whether or not one eye is closed depending on a ratio between the eye region values with respect to the respective right and left eyes.

In the second embodiment, one eye determining step determines whether or not one eye is closed depending on a ratio between the eye region values with respect to the respective right and left eyes. For example, when an area of one eye region is smaller than that of two-thirds of the other eye region, it is determined that the one eye is closed.

According to the second embodiment, since the ratio between the eye region values of the right and left eyes are evaluated and compared, it is easily determine whether one eye is closed.

In a third embodiment the information processing program further causes the computer to execute a search region setting step for setting search regions to the respective right and left eyes, and the eye region value calculating step calculates the eye region values from the respective search regions with respect to the right and left eyes set by the search region setting step.

In the third embodiment, a search region setting step (34, S77) sets search regions to the respective right and left eyes. The eye region value calculating step calculates the eye region values from the respective search regions with respect to the right and left eyes set by the search region setting step. That is, the eyes region values with respect to the right and left eyes are calculated from a part of the facial image.

According to the third embodiment, since the search regions are set, the entire face is not required to be searched. That is, this brings efficiency to the processing.

In a fourth embodiment the eye region value calculating step includes a black eye region value calculating step for calculating black eye region values indicating sizes of black eye regions of the respective right and left eyes from the facial image of the user photographed by the photographing means.

In the fourth embodiment, the eye regions are black eye regions of the right and left eyes. The black eye region value calculating step calculates black eye region values indicating sizes of black eye regions of the respective right and left eyes. For example, the black eye region value is a numerical value as to the area of the black eye region and the length (the vertical longest part) of the black eye region. Here, the color of the eyes is not restricted to black, and includes other colors (brown, blue, etc.).

According to the fourth embodiment, since the sizes of the black eye regions are merely compared between the right and left eyes, it is possible to determine whether or not one eye is closed by a simple calculation.

In a fifth embodiment the information processing program causes the computer to further execute a feature point acquiring step for acquiring feature points of the right and left eyes from the facial image of the user photographed by the photographing means, and the search region setting step sets the respective search regions with respect to the right and left eyes by utilizing the feature points of the right and left eyes acquired by the feature point acquiring step.

In the fifth embodiment, a feature point acquiring step (34, S43, S47) acquires feature points of the right and left eyes from the facial image of the user photographed by the photographing means. The search region setting step sets the respective search regions with respect to the right and left eyes by utilizing the feature points of the right and left eyes acquired by the feature point acquiring step. For example, by utilizing the distance between the right eye and the left eye, the regions for searching the black eye regions with respect to the right and left eyes is set.

According to the fifth embodiment, since the feature points of the right and left eyes are utilized, it is possible to acquire the black eye region values by surely recognizing the positions of the eyes. That is, it is possible to accurately determine that one eye is closed.

In a sixth embodiment the information processing program causes the computer to further execute a black eye reference value calculating step for calculating black eye reference values from the respective search regions with respect to the right and left eyes set by the search region setting step, and the black eye region value calculating step calculates the black eye region values by regarding the black eye reference values calculated by the black eye reference value calculating step as threshold values.

In the sixth embodiment, a black eye reference value calculating step (34, S79, S81, S83, S85, S87, S89) calculates black eye reference values from the respective search regions with respect to the right and left eyes set by the search region setting step. The black eye region value calculating step calculates the black eye region values by regarding the black eye reference values as threshold values. For example, it is possible to determine whether the black eye or the white eye by means of the black eye reference values.

According to the sixth embodiment, since the black eye region values are calculated by regarding the black eye reference values as threshold values, it is possible to accurately determine that one eye is closed regardless of varieties due to individual differences and photographing conditions.

In a seventh embodiment the search region setting step sets the respective search regions with respect to the right and left eyes regarding the feature points of the right and left eyes acquired by the feature point acquiring step as centers.

In the seventh embodiment, the search region setting step sets the respective search regions with respect to the right and left eyes regarding the feature points of the right and left eyes acquired by the feature point acquiring step as centers. For example, the feature points are set as the central points of the black eye regions of the right and left eyes.

According to the seventh embodiment, since the search regions are set by regarding the feature points of the right and left eyes as centers, it is possible to surely contain the black eye regions within the search regions.

In an eighth embodiment the information processing program causes the computer to further execute a distance calculating step for calculating a distance between the feature points of the right and left eyes acquired by the feature point acquiring step, and the search region setting step sets the respective search regions with respect to the right and left eyes by utilizing the distance between the feature points of the right and left eyes calculated by the distance calculating step.

In the eighth embodiment, the distance calculating step (34, S75) calculates a distance between the feature points of the right and left eyes acquired by the feature point acquiring step. The search region setting step sets the respective search regions with respect to the right and left eyes by utilizing the distance between the feature points.

According to the eighth embodiment, since the search regions are set by using the distance between the feature points of the right and left eyes, it is possible to easily set the search regions. Furthermore, it is possible to surely contain the black eye within the search region by utilizing the distance.

In a ninth embodiment the information processing program causes the computer to further execute a normalizing step for normalizing the black eye region values calculated by the black eye region value calculating step by utilizing the distance between the feature points of the right and left eyes calculated by the distance calculating step, and the one eye determining step determines whether or not one eye is closed by comparing the black eye region values with respect to the right and left eyes normalized by the normalizing step.

In the ninth embodiment, a normalizing step (34, S161, S223) normalizes the black eye region values calculated by the black eye region value calculating step by utilizing the distance between the feature points of the right and left eyes calculated by the distance calculating step. The one eye determining step determines whether or not one eye is closed by comparing the black eye region values with respect to the right and left eyes normalized by the normalizing step.

In the ninth embodiment, since the black eye region values are normalized by the distance between the feature points of the right and left eyes, it is possible to determine whether or not one eye is closed regardless of a contraction scale of the photographed facial image.

In a tenth embodiment the black eye reference values are values relating to brightness in the respective search regions with respect to the right and left eyes set by the search region setting step.

In the tenth embodiment, the black eye reference values are values relating to brightness in the respective search regions with respect to the right and left eyes set by the search region setting step. For example, by the difference in brightness between the right and left eyes, the black eye reference values of the right and left eyes are set to different values.

According to the tenth embodiment, it is possible to absorb variations due to individual differences and photographing conditions.

In the eleventh embodiment the black eye reference value calculating step sets the black eye reference values by utilizing at least any one of the darkest color and the brightest color within the entire search region set by the search region setting step.

In the eleventh embodiment, the black eye reference value calculating step sets the black eye reference values by utilizing at least any one of the darkest color and the brightest color within the entire search region set by the search region setting step. For example, the darkest color (or bright color) in the search region of the left eye and the darkest color (or bright color) in the search region of the right eye are compared, the difference in brightness is detected, and the black eye reference values are set. Or, from the result of the comparison between the darkest colors and the result of the comparison between the brightest colors, the difference in brightness is detected, and the black eye reference values are set.

According to the eleventh embodiment, the reference values indicating whether black or not are set on the basis of the brightest pixel in the respective right and left eyes and the darkest pixel in the respective right and left eyes, and therefore, it is possible to decrease an influence of noise, etc.

In a twelfth embodiment the black eye region value calculating step includes a first direction reference value setting step for setting the darkest pixel as a first direction reference value by scanning in a first direction the search region set by the search region setting step, a pixel count calculating step for calculating the number of pixels being successively aligned from the first direction reference value and being darker than the black eye reference value, and the number of pixels calculated by the pixel count calculating step is regarded as the black eye region value.

In the twelfth embodiment, a first direction reference value setting step (34, S95, S167) sets the darkest pixel as a first direction reference value by scanning in a first direction the search region set by the search region setting step. A pixel count calculating step (34, S97-S123, S169-S195) calculates the number of pixels being successively aligned from the first direction reference value and being darker than the black eye reference value. The black eye region value calculating step regards the number of dark pixels calculated by the pixel count calculating step as a black eye region value.

According to the twelfth embodiment, since the number of dark pixels being successively aligned in the first direction is calculated by regarding the darkest pixel as a center, it is possible to calculate the line made up with the successive black pixels on the basis of the accurate reference.

In a thirteenth embodiment the black eye region value calculating step includes a pixel count adding step for repetitively executing the first direction reference value setting step and the pixel count calculating step by successively shifting on pixel by pixel basis in a second direction orthogonal to the first direction, and adding the number of pixels being successively aligned from the first direction reference value and being darker than the black eye reference value, and the number of dark pixels added by the pixel count adding step is regarded as the black eye region value.

In the thirteenth embodiment, after completion of scanning in the first direction, the pixel count adding step repetitively executes the first direction reference value setting step and the pixel count calculating step by successively shifting on pixel by pixel basis in a second direction orthogonal to the first direction (34, S131, S203), and adds the number of pixels being successively aligned from the first direction reference value and being darker than the black eye reference value. That is, the black eye region value calculating step sequentially calculates the number of successive pixels being aligned in the first direction and being darker than the black eye reference value by shifting on pixel by pixel basis in the second direction orthogonal to the first direction, and the number of dark pixels is regarded as a black eye region.

According to the thirteenth embodiment, the black eye region value is evaluated by shifting the line made up with the successive dark pixels in the first direction in the second direction orthogonal to the first direction to thereby evaluate the added value, capable of accurately evaluating the black eye region value.

In a fourteenth embodiment the black eye region value calculating step sets an invalid value as the black eye region value when the number of pixels being successively aligned from the first direction reference value and being darker than the black eye reference value by the pixel count calculating step reaches above a predetermined number.

In the fourteenth embodiment, the black eye region value calculating step determines to be not black eyes but hair, eyelashes, etc and sets an invalid value as the black eye region value (34, S129, S201) when the number of pixels being successively aligned from the first direction reference value and being darker than the black eye reference value by the pixel count calculating step reaches above a predetermined number ("YES" in S125 or S197).

According to the fourteenth embodiment, in a case that that the black eye region value is equal to or more than the predetermined number, it is determined not to be black eyes, and the black eye region value is invalidated, and therefore, an undesired state like eyes covered with hair, closed eyes with long eyelashes can be excluded from the determination whether or not one eye is closed.

In a fifteenth embodiment the feature point acquiring step, the search region calculating step, the black eye reference value calculating step, and the black eye region value calculating step are repetitively executed by the computer at least twice, and the information processing program causes the computer to execute the one eye determining step only when an invalid value is not successively set to the black eye region value.

In the fifteenth embodiment, the information processing program causes the computer to respectively execute at least twice the feature point acquiring step, the search region calculating step, the black eye reference value calculating step, and the black eye region value calculating step. The information processing program then causes the computer to execute one eye determining step only when an invalid value is not successively set to the black eye region value ("NO" in S17).

According to the fifteenth embodiment, it is determine whether or not one eye is closed from results of the processing in plurality of times, and therefore, it is possible to make stable and accurate determination.

In a sixteenth embodiment the pixel count calculating step sets, when pixels brighter than the black eye reference value are successively aligned by a predetermined number or more, the number from the first direction reference value to the bright pixel as the black eye region value.

In the sixteenth embodiment, the pixel count calculating step sets, when pixels brighter than the black eye reference value are successively aligned by a predetermined number or more ("YES" in step S107, S121, S179, S193), the number from the first direction reference value to the bright pixel is set as the black eye region value. In other words, the white part included in the black eye is determined to be a black eye, making it possible to accurately discriminate the black eye from the white eye.

According to the sixteenth embodiment, the black eye and the white eye are accurately distinguished, capable of accurately calculating the black eye region value.

In a seventeenth embodiment the information processing program causes the computer to further execute a gray-scaling step for gray-scaling the facial image of the user photographed by the photographing means, and the black eye region value calculating step calculates black eye region values from the facial image gray-scaled by the gray-scaling step.

In the seventeenth embodiment, gray-scaling step (34, S71) gray-scales the facial image of the user photographed by the photographing means. That is, the gray-scale image of the facial image is acquired. The black eye region value calculating step calculates black eye region values from the facial image gray-scaled by the gray-scaling step.

According to the seventeenth embodiment, the facial image is gray-scaled, and therefore, it is possible to easily detect the black eye regions.

In the eighteenth embodiment the information processing program further causes the computer to further execute a search region setting step for setting search regions to the respective right and left eyes, and the eye region value calculating step calculates the eye region values from the respective search regions with respect to the right and left eyes set by the search region setting step.

In also the eighteenth embodiment, similarly to the third embodiment, it is possible to bring efficiency to the processing.

In a nineteenth embodiment the eye region value calculating step includes a black eye region value calculating step for calculating black eye region values indicating sizes of black eye regions of the respective right and left eyes from the facial image of the user photographed by the photographing means.

In the nineteenth embodiment, similarly to the fourth embodiment, the eye regions are the black eye regions of the right and left eyes, a black eye region value calculating step calculates black eye region values indicating sizes of black eye regions of the respective right and left eyes.

In also the nineteenth embodiment, similarly to the fourth embodiment, it is possible to determine whether or not one eye is closed by relatively simple calculation.

In a twentieth embodiment the information processing program causes the computer to further execute a feature point acquiring step for acquiring feature points of the right and left eyes from the facial image gray-scaled by said gray-scaling step, and the search region setting step sets the respective search regions with respect to the right and left eyes by utilizing the feature points of the right and left eyes acquired by the feature point acquiring step.

In also the twentieth embodiment, similarly to the fifth embodiment, it is possible to acquire the black eye region values by surely recognizing the positions of the eyes.

In the twenty-first embodiment the information processing program causes the computer to further execute a black eye reference value calculating step for calculating black eye reference values from the respective search regions with respect to the right and left eyes set by the search region setting step, and the black eye region value calculating step calculates the black eye region values by regarding the black eye reference values calculated by the black eye reference value calculating step as threshold values.

In also the twenty-first embodiment, similarly to the sixth embodiment, it is possible to accurately determine that one eye is closed regardless of varieties due to individual differences and photographing conditions.

In a twenty-second embodiment the search region setting step sets the respective search regions with respect to the right and left eyes regarding the feature points of the right and left eyes acquired by the feature point acquiring step as centers.

In also the twenty-second embodiment, similarly to the seventh embodiment, it is possible to surely contain the black eye regions within the search regions.

In a twenty-third embodiment the information processing program causes the computer to further execute a processing step for executing a predetermined process in a case that it is determined that one eye is closed by the one eye determining step.

In the twenty-third embodiment, the information processing program causes the computer to execute processing step in a case that it is determined that one eye is closed by one eye determining step ("YES" in S19, S23).

According to the twenty-third embodiment, in response to the user closing one eye, a predetermined processing is performed, and therefore, the user does not require a manual operation.

In a twenty-fourth embodiment an information processing apparatus having a photographing means, and capturing a facial image of a user by the photographing means comprises: an eye region value calculating means for calculating respective eye region values indicating sizes of regions of right and left eyes from the facial image of the user photographed by the photographing means; and an one eye determining means for determining whether or not one eye is closed by comparing the eye region values with respect to the right and left eyes calculated by the eye region value calculating means.

In also the twenty-fourth embodiment, similarly to the first embodiment it is possible to detect a motion of closing one eye.

In a twenty-fifth embodiment an information processing method of an information processing apparatus having a photographing means and capturing a facial image of a user by the photographing means comprises (a) calculating respective eye region values indicating sizes of regions of right and left eyes from the facial image of the user photographed by the photographing means; and (b) determining whether or not one eye is closed by comparing the eye region values with respect to the right and left eyes calculated by step (a).

In also the twenty-fifth embodiment, similarly to the first embodiment it is possible to detect a motion of closing one eye.

The above described features, aspects and advantages of the present embodiments will become more apparent from the following detailed description of the present embodiments when taken in conjunction with the accompanying drawings.

BRIEF DESCRIPTION OF THE DRAWINGS

FIG. 5 is an illustrative view showing another example of a game screen displayed on the first LCD of the game apparatus shown in FIG. 3;

FIG. 22 is an illustrative view showing a color detection range and an area scanning range in the area measuring processing.

DETAILED DESCRIPTION OF THE PREFERRED EMBODIMENTS

Figure 1:
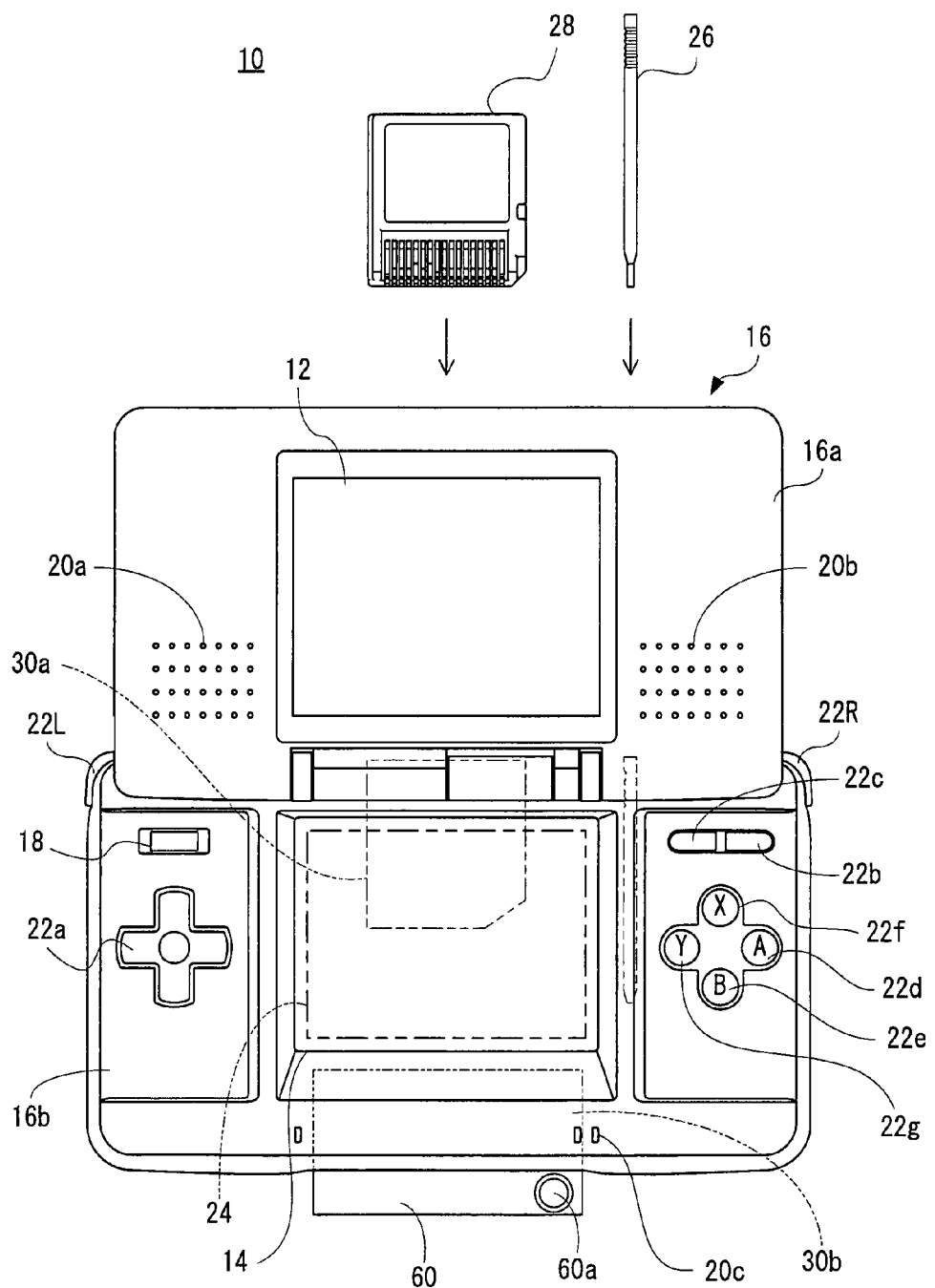
FIG. 1 is an illustrative view showing one embodiment of a game apparatus.

Referring to FIG. 1, a game apparatus 10 of one embodiment includes a first liquid crystal display (LCD) 12 and a second LCD 14. The LCD 12 and the LCD 14 are provided on a housing 16 so as to be arranged in predetermined positions. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Also, on the lower housing 16b, a power switch 18 is provided at the left of the LCD 14.

Furthermore, the upper housing 16a is provided with sound release holes 20a and 20b for speakers 36a and 36b (FIG. 2) on both sides of the LCD 12. The lower housing 16b is provided with a microphone hole 20c for a microphone (not illustrated) and operating switches 22 (22a, 22b, 22c, 22d, 22e, 22L and 22R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch 22 includes a direction instructing switch (cross switch) 22a, a start switch 22b, a select switch 22c, an action switch (A button) 22d, an action switch (B button) 22e, an action switch (X button) 22f, an action switch (Y button) 22g, an action switch (L button) 22L, and an action switch (R button) 22R. The switch 22a is arranged at the left of the LCD 14 on one surface of the lower housing 16b. Other switches 22b-22g are arranged at the right of the LCD 14 on the one surface of the lower housing 16b. In addition, the switch 22L and the switch 22R are arranged at the right and left corners sandwiching the connected portion with the upper housing 16a on the upper side surface of the lower housing 16b.

The direction instructing switch 22a functions as a digital joystick, and is utilized for instructing a moving direction of a player character (or player object) to be operated by a user or a player and instructing a moving direction of a cursor, and so forth by operating any one of four depression portions. Also, a specific role can be assigned to each of the four depression portions, and by operating any one of the four depression portions, it is possible to instruct (designate) the assigned role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. Furthermore, the action switch 22d can decide an item selected by the direction instructing switch 22a or the select switch 22c. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push buttons, and are utilized for a subsidiary operation when the game cannot be advanced only with the A button 22d and the B button 22e. It should be noted that the X button 22f and the Y button 22g can be used for the similar operation to the A button 22d and B button 22e. Of course, the X button 22f and the Y button 22g are not necessarily utilized in the game play.

The action switch (left depression button) 22L and the action switch (right depression button) 22R are formed by the push button, and the left depression button (L button) 22L and the right depression button (R button) 22R can perform the same operation as the A button 22d and the B button 22e, and also function as a subsidiary of the A button 22d and the B button 22e. In addition, the L button 22L and the R button 22R can change the roles assigned to the direction switch 22a, the A button 22d, the B button 22e, the X button 22f, and the Y button 22g to other roles.

Also, on a top surface of the LCD 14, a touch panel 24 is provided. As the touch panel 24, any one of kinds of a resistance film system, an optical system (infrared rays system) and an electrostatic capacitive coupling system, for example, can be utilized. In response to an operation (touch input) by depressing, stroking, touching, and so forth with a stick 26, a pen (stylus pen), or a finger (hereinafter, referred to as "stick 26, etc.") on a top surface of the touch panel 24, the touch panel 24 detects a coordinates of an operated position of the stick 26, etc. (that is, touched) to output coordinates data corresponding to the detected coordinates.

It should be noted that in this embodiment, a resolution of the display surface of the LCD 14 (the same is true for the LCD 12) is 256 dots×192 dots, and a detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Additionally, a game play screen may be displayed on the one LCD (LCD 14 in this embodiment), and a game screen including information relating to the game (score, level, etc.) can be displayed on the other LCD (LCD 12 in this embodiment). Furthermore, by utilizing the two LCD 12 and LCD 14 as one screen, it is possible to display a large monster (enemy character) to be defeated by the player character.

Accordingly, the player is able to point (operate) an image such as a player character, an enemy character, an item character, an operating object, etc. to be displayed on the screen of the LCD 14 and select (input) commands by operating the touch panel 24 with the use of the stick 26, etc. Also, it is possible to change the direction of a virtual camera (viewpoint) (direction of the line of sight) provided in the three-dimensional game space, and instruct a scrolling (gradual moving display) direction of the game screen (map).

It should be noted that depending on the kind of the game, other input instructions can be made with the use of the touch panel 24. For example, it is possible to input by hand a coordinates input instruction, and input texts, numbers, symbols, etc. on the LCD 14.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two systems.

In addition, in this embodiment, the stick 26 can be housed in the housing portion (shown by dotted lines in FIG. 1) provided on the lower housing 16b, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30a (shown by dotted lines in FIG. 1) provided on a rear surface or a upper edge (top surface) of the lower housing 16b. Although omitted in FIG. 1, a connector 32 (see FIG. 2) is provided at a depth portion of the loading slot 30a for connecting a connector (not shown) provided at an end portion of the memory card 28 in the loading direction, and when the memory card 28 is loaded into the loading slot 30a, the connectors are connected with each other, and therefore, the memory card 28 is accessible by a CPU core 34 (see FIG. 2) of the game apparatus 10.

In addition, the game apparatus 10 includes a camera cartridge 60. The camera cartridge 60 is detachable, and inserted into an inserting portion 30b (shown by dotted lines in FIG. 1) provided on the rear surface of the lower edge (bottom surface) of the lower housing 16b. Although omitted in FIG. 1, a connector 32b (see FIG. 2) is provided at a depth portion of the inserting slot 30b for connecting a connector (not shown) provided at an end portion of the camera cartridge 60 in the inserting direction, and when the camera cartridge 60 is inserted into the inserting portion 30b, the connectors are connected with each other, and therefore, the camera cartridge 60 is accessible by a CPU core 34 (see FIG. 2) of the game apparatus 10.

It should be noted that although not illustrated in FIG. 1, the speakers 36a and 36b (see FIG. 2) are provided at a position corresponding to the sound release holes 20a and 20b inside the upper housing 16a.

Furthermore although omitted in FIG. 1, for example, a battery accommodating box is provided on a rear surface of the lower housing 16b, and a volume switch, an external expansion connector, an earphone jack, etc. are provided on a bottom surface of the lower housing 16b.

Figure 2:
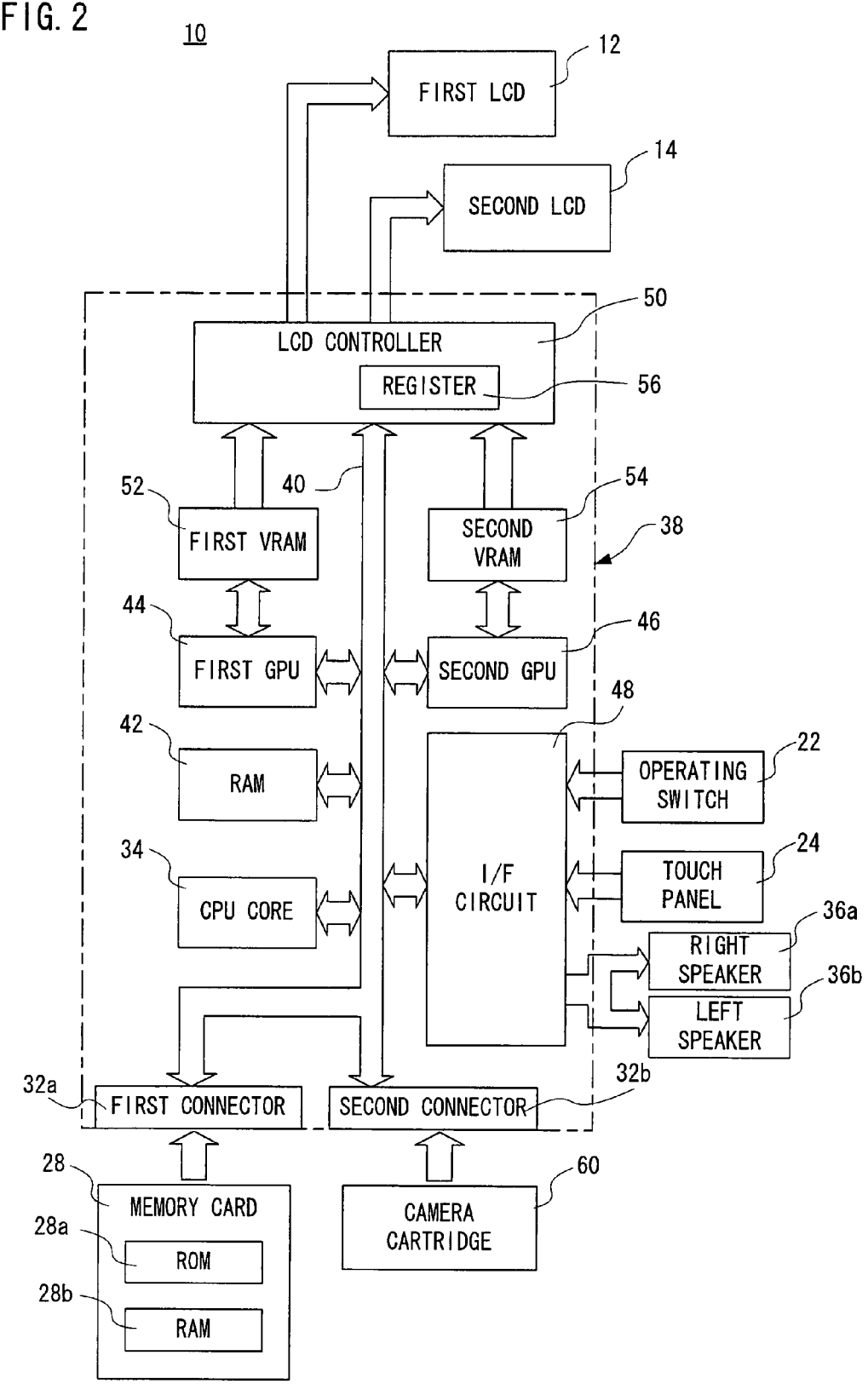
FIG. 2 is a block diagram showing an electric configuration of the game apparatus shown in FIG. 1.

FIG. 2 is a block diagram showing an electrical configuration of the game apparatus 10. Referring to FIG. 2, the game apparatus 10 includes an electronic circuit board 38, and on the electronic circuit board 38, a circuit component such as a CPU core 34, etc. is mounted. The CPU core 34 is connected to the above-described connectors 32a and 32b via a bus 40, and is connected with a RAM 42, a first graphics processing unit (GPU) 44, a second GPU 46, an input-output interface circuit (hereinafter, referred to as "I/F circuit") 48, and an LCD controller 50.

The connector 32a is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 32a. Accordingly, the CPU core 34 gains access to the ROM 28a and the RAM 28b as described above.

The ROM 28a stores in advance a game program for a game to be executed by the game apparatus 10, image data (text and object image, background image, item image, icon (button) image, message image, etc.), data of the sound (music) necessary for the game (sound data), etc. The RAM (backup RAM) 28b stores (saves) proceeding data of the game, result data of the game, etc.

The RAM 42 is utilized as a buffer memory or a working memory. That is, the CPU core 34 loads the game program, the image data, the sound data, etc. stored in the ROM 28a of the memory card 28 into the RAM 42, and executes the loaded game program. The CPU core 34 executes a game process while storing data (game data, flag data, etc.) generated or obtained in correspondence with a progress of the game in the RAM 42.

It should be noted that the game program, the image data, the sound data, etc. are stored (loaded) from the ROM 28a entirely at a time, or partially and sequentially so as to be stored into the RAM 42.

However, a program as to an application except for the game and image data required to execute the application may be stored in the ROM 28a of the memory card 28. In addition, sound (music) data may be stored therein as necessary. In such a case, in the game apparatus 10, the application is executed.

Also, the connector 32b, as described above, is detachably attached with the camera cartridge 60. The camera cartridge 60 has a camera function utilizing an imaging device like a CCD imager, a CMOS imager, and applies the data of the photographed image (photographed image data) to the CPU core 34 through the connector 32b and the bus. The CPU core 34 stores (temporarily stores) the photographed image data from the camera cartridge 60 in the RAM 42. It should be noted that a lens 60a of the imaging device is provided so as to be exposed from the housing of the camera cartridge 60 in FIG. 1.

Each of the GPU 44 and the GPU 46 forms a part of a rendering means, is constructed by, for example, a single chip ASIC, and receives a graphics command from the CPU core 34 to generate image data according to the graphics command. It should be noted that the CPU core 34 applies an image generation program (included in the game program) required to generate the image data to both of the CPU 44 and GPU 46 in addition to the graphics command.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain necessary data (image data: polygon data, texture data, etc.) It should be noted that the CPU core 34 writes image data necessary for rendering to the first VRAM 52 and the second VRAM 54 via the GPU 44 and the GPU 46. The GPU 44 accesses the VRAM 52 to create image data for rendering, and the GPU 46 accesses the VRAM 54 to create image data for rendering.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. The LCD controller 50 outputs the image data created by the GPU 44 to the LCD 12, and outputs the image data created by the GPU 46 to the LCD 14 in a case that the data value of the register 56 is "038". Additionally, the LCD controller 50 outputs the image data created by the GPU 44 to the LCD 14, and outputs the image data created by the GPU 46 to the LCD 12 in a case that the data value of the register 56 is "1".

It should be noted that the LCD controller 50 can directly read the image data from the VRAM 52 and the VRAM 54, or read the image data from the VRAM 52 and the VRAM 54 via the GPU 44 and the GPU 46.

The I/F circuit 48 is connected with the operating switch 22, the touch panel 24 and the speakers 36a, 36b. Here, the operating switch 22 is the above-described switches 22a, 22b, 22c, 22d, 22e, 22L and 22R, and in response to an operation of the operating switch 22, a corresponding operation signal (operation data) is input to the CPU core 34 via the I/F circuit 48. Furthermore, the coordinates data output from the touch panel 24 is input to the CPU core 34 via the I/F circuit 48. In addition, the CPU core 34 reads from the RAM 42 the sound data necessary for the game such as a game music (BGM), a sound effect or voices of a game character (onomatopoeic sound), etc., and outputs it from the speakers 36a, 36b via the I/F circuit 48.

Figure 3:
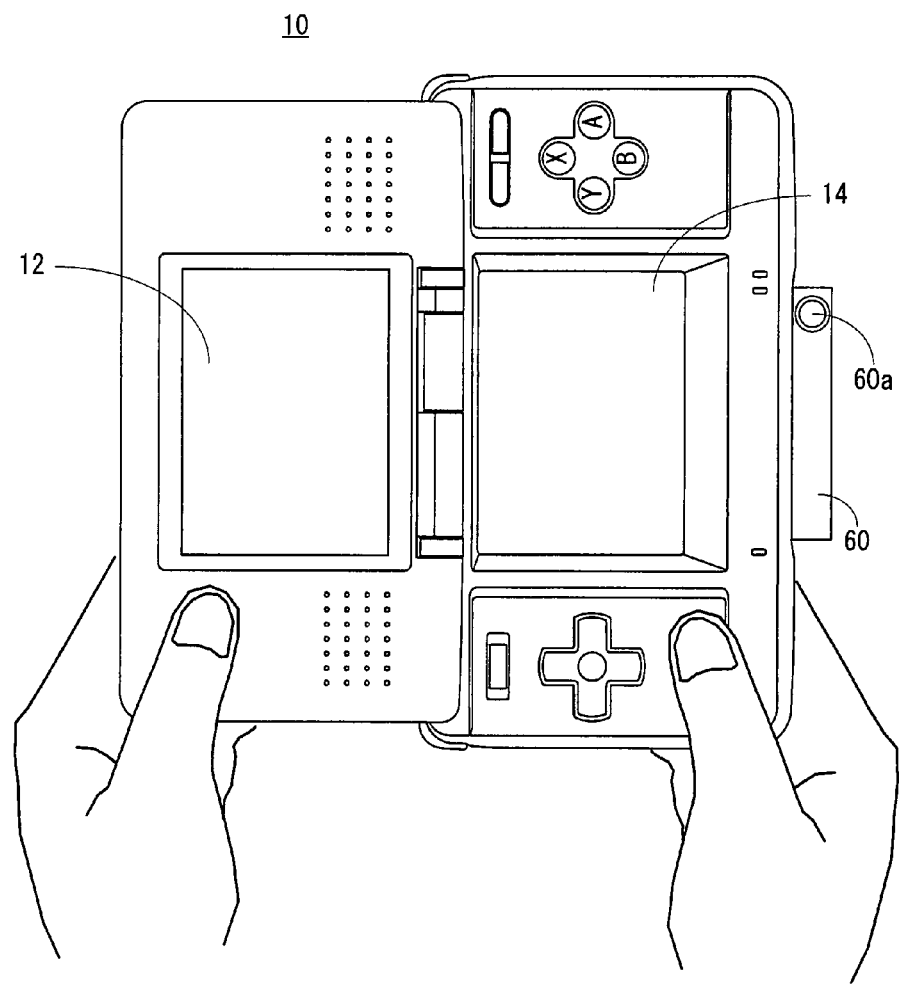
FIG. 3 is an illustrative view showing an example of use of the game apparatus shown in FIG. 1.

FIG. 3 is an illustrative view showing an example of use of the game apparatus 10 in this embodiment. As understood from FIG. 1 and FIG. 3, in FIG. 3, the user or the player (hereinafter, simply referred to as "user") holds the game apparatus 10 with both of the hands in a state that the game apparatus 10 shown in FIG. 1 is rotated at about 90° counterclockwise. Accordingly, the LCD 12 and the LCD 14 are arranged side by side. In this manner, the face of the user is photographed by the camera cartridge 60, and the user executes an application, such as a virtual game, etc. viewing screens displayed on the LCD 12 and the LCD 14.

Figure 4:
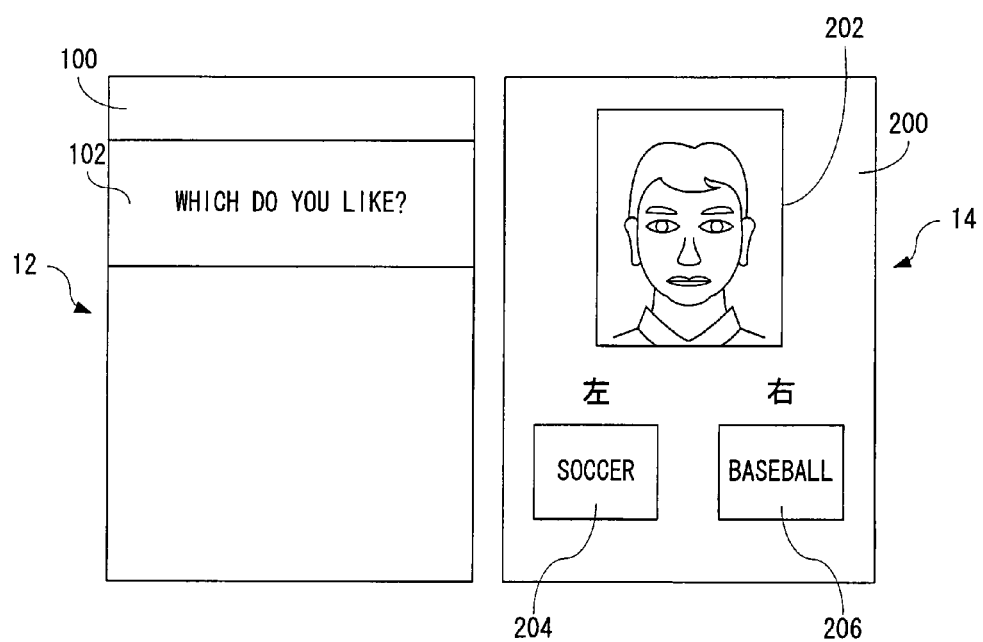
FIG. 4 is an illustrative view showing one example of game screens displayed on a first LCD and a second LCD of the game apparatus shown in FIG. 3.

FIG. 4 shows an example of the screen 100 displayed on the LCD 12 and the screen 200 displayed on the LCD 14 in a state shown in FIG. 3 in a case that an application such as a virtual game, etc. is executed by utilizing the above-described game apparatus 10. It should be noted that in FIG. 4, for simplicity, only the display surfaces of the LCD 12 and the LCD 14 are displayed. The screen 100 includes a display region 102 at the upper part, and in the display region 102, a content of a question to the user, for example, is text-displayed.

Furthermore, the screen 200 includes a display region 202 at the top center, and in the display region 202, an image (a facial image of the user in this embodiment) is displayed. The facial image is a facial image of the user photographed by the above-described camera cartridge 60, and a mirror image of the facial image is displayed in the display region 202. Furthermore, options for answering the question displayed in the display region 102 are respectively text-displayed on a button image 204 and a button image 206 below the display region 202.

In such an application, a motion of closing one eye by the user makes it possible to perform an operation such as depressing (turning on) the button images (204, 206). That is, the user can input a command by a motion of closing one eye in place of an operation with the operating switch 22 and a touch input (touch operation) of the touch panel 24.

In the example shown in FIG. 4, the user can answer the question displayed at the display region 102 of the screen 100 by closing any one of the left eye and the right eye to select (turn on) the button image 204 or the button image 206. However, it is necessary that the facial image of the user is photographed by the camera cartridge 60, and a motion of closing one eye is recognized. For making it easy for the user to determine whether or not the facial image of the user is photographed, an image photographed by the camera cartridge 60 is displayed at the display region 202 of the screen 200.

FIG. 5(A) and FIG. 5(B) show other examples of the screen 100 and the screen 200. At the upper portion of the screen 100 shown in FIG. 5(A), the display region 110, an instruction or notification (message) to the user is text-displayed. On the screen 200 shown in FIG. 5(A), a button image 208 is displayed below the display region 202. In such a case, by closing any one of the left eye and the right eye to thereby turn on the button image 208, the user can input viewing (understanding) of the instruction or the message displayed on the screen 100.

Furthermore, on the screen 100 shown in FIG. 5(B), a background (map) of the game screen is entirely displayed, and at the lower center thereof, a player character 120 is displayed. On the other hand, on the screen 200 shown in FIG. 5(B), a button image 210 and a button image 212 are provided below the display region 202. In such a case, the user can instruct the direction of travel (left or right) of the player character 120 by closing the left eye or the right eye to thereby to turn on the button image 210 or the button image 212.

Figure 6:
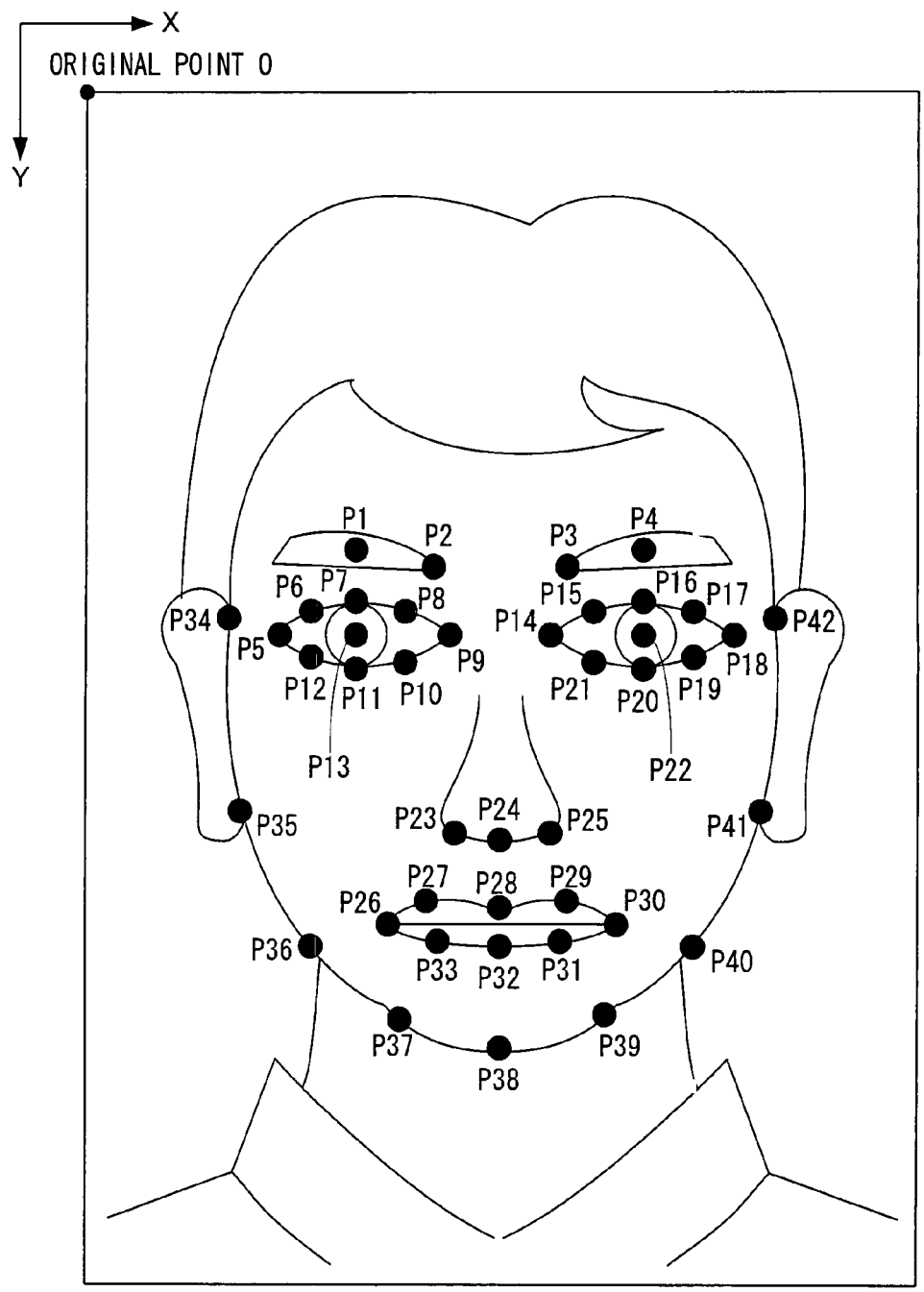
FIG. 6 is an illustrative view showing feature points detected from a photographed facial image.

Thus, by a closing one eye motion, it is possible to operate the application. A detecting method of a closing one eye operation is briefly explained here. FIG. 6 is an illustrative view showing a facial image of the photographed user and its feature point Pi (i=1, 2, . . . , 41, 42). It should be noted that in FIG. 6, the image developed in the RAM 42 is represented by a camera coordinate system, and a region for displaying an image (development region) is ensured by the region corresponding to the size of the LCD 14 in the RAM 42 as described later. As understood from FIG. 6, the vertex of the upper left of the development region is the original point O of the camera coordinates. Furthermore, in the camera coordinate system, the right direction of the drawing is a plus direction of the X-axis, and the lower direction of the drawing is a plus direction of the Y-axis.

The positions of the feature points Pi of the facial image of the user are detected by performing image processing such as an edge detection, etc. on the facial image of the user photographed by the camera cartridge 60. When the feature points Pi are detected, by scanning a part of the photographed image by means of the feature points Pi, an area as to each of regions of the black eyes of the left eye and the right eye (black eye region) is obtained. Then, according to the comparison result (ratio) between the areas of the black eyes of the right eye and the left eye, it is determined whether or not the one eye (the left eye or the right eye) is closed. Although a motion of closing an eye is referred to as a wink below in this embodiment, a motion of closing the both eyes is not included.

Figure 7:
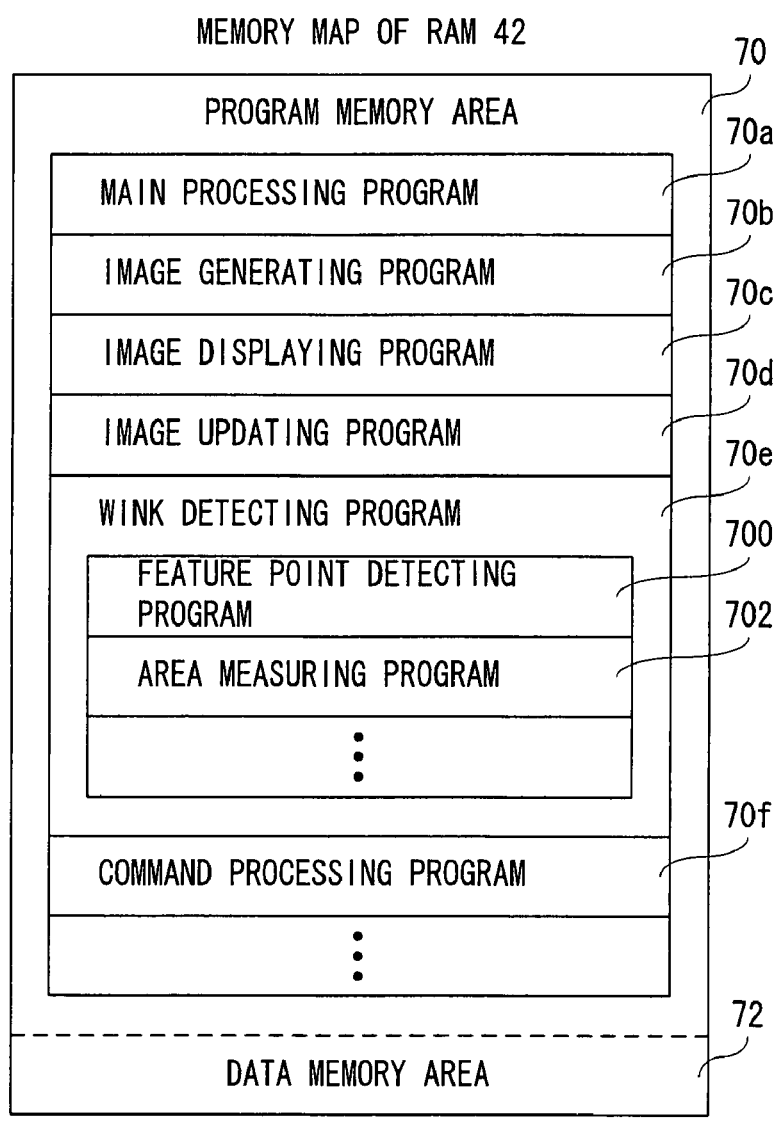
FIG. 7 is an illustrative view showing one example of a memory map of a RAM of the game apparatus shown in FIG. 2.

FIG. 7 is an illustrative view showing one example of a memory map of the RAM 42 shown in FIG. 2. As shown in FIG. 7, the RAM 42 includes a program memory area 70 and a data memory area 72. The program memory area 70 stores an application program (information processing program) of a virtual game, etc., and the information processing program is made up with a main processing program 70a, an image generating program 70b, an image displaying program 70c, an image updating program 70d, a wink detecting program 70e, a command processing program 70f, etc. Furthermore, the wink detecting program 70e includes a feature point detecting program 700, an area measuring program 702, etc.

The main processing program 70a is a program for processing a main routine of the application. The image generating program 70b is a program for generating an image (application image) required to execute an application by means of polygon data, texture data, etc. The image displaying program 70c is a program for displaying the application image generated according to the image generating program 70b on the LCD 12 and the LCD 14. The image updating program 70d is a program for updating the screen 100 and the screen 200 respectively displayed on the LCD 12 and the LCD 14.

The wink detecting program 70e is a program for detecting a wink and the closed eye of the user. The feature point detecting program 700 is a program for detecting and updating the 42 feature points Pi in the facial image by performing image processing such as a edge detection, etc. on the facial image of the user photographed (imaged) by the camera cartridge 60 for every constant time (ten frames in this embodiment: frame is a screen updating rate (1/60 seconds)). The area measuring program 702 is a program for measuring areas of the black eye regions of the right eye and the left eye by means of the feature points Pi detected according to the feature point detecting program 700.

The command processing program 70f is, when a wink and a closed eye is detected according to the wink detecting program 70e, a program for executing processing according to the closed eye.

Although illustration is omitted, the information processing program includes a sound output program, a backup program, etc. The sound output program is a program for generating and outputting a sound (music) required for executing an application by means of the sound (music) data not shown. The backup program is a program for storing (saving) data now in operation (proceeding data) or data after operation (result data) in the RAM28b of the memory card 28 according to an instruction by the user or an event occurring during execution of the application.

Figure 8:
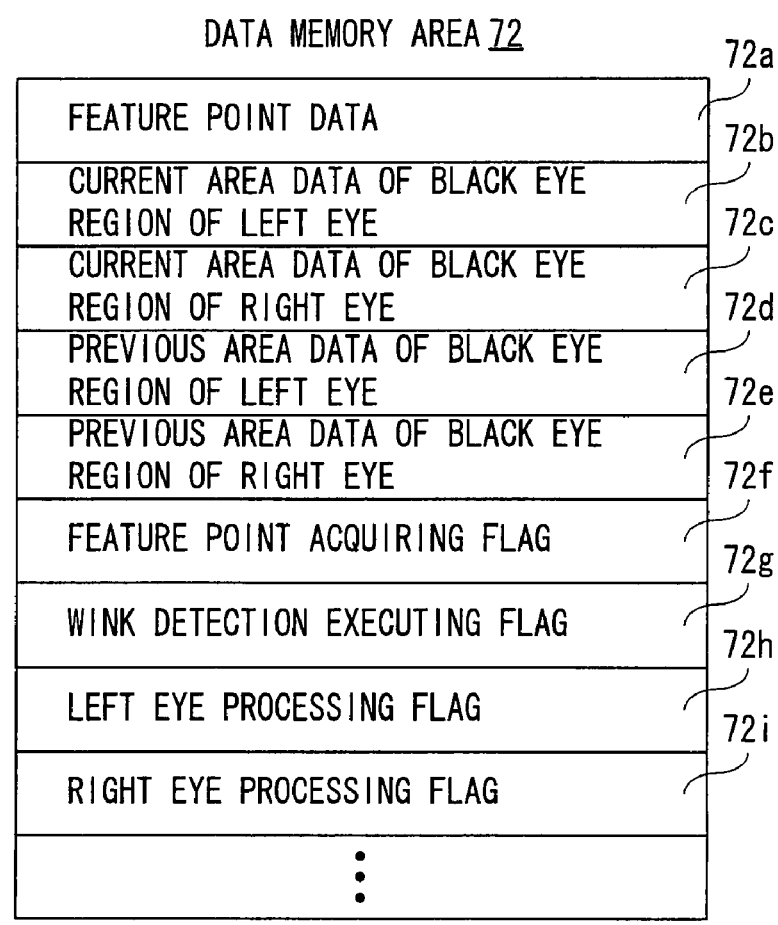
FIG. 8 is an illustrative view showing a detailed content of a data memory area shown in FIG. 7.

FIG. 8 is an illustrative view showing one example of a detailed content of the data memory area 72 shown in FIG. 7. As shown in FIG. 8, in the data memory area 72, feature point data 72a, current area data of the black eye region of the left eye 72b, current area data of the black eye region of the right eye 72c, previous area data of the black eye region of the left eye 72d, and previous area data of the black eye region of the right eye 72e are stored. Furthermore, a feature point acquiring flag 72f, a wink detection executing flag 72g, a left eye processing flag 72h, and a right eye processing flag 72i are stored.

The feature point data 72a is coordinates data as to all the feature points Pi detected according to the feature point detecting program 70f. The current area data of the black eye region of the left eye 72b is data of an area currently measured as to the black eye region of the left eye. The current area data of the black eye region of the right eye 72c is data of an area currently measured as to the black eye region of the right eye. The previous area data of the black eye region of the left eye 72d is data of an area previously measured as to the black eye region of the left eye. The previous area data of the black eye region of the right eye 72e is data of an area previously measured as to the black eye region of the right eye.

The feature point acquiring flag 72f is a flag showing whether or not the feature points Pi are acquired from the photographed image data, and constructed by a one bit register, for example. In a case that the feature points Pi are acquired from the photographed image data, the feature point acquiring flag (IsEnable) 72f is established (true), and a data value "1" is set in the register. On the other hand, in a case that the feature points Pi are not acquired from the photographed image data, the feature point acquiring flag 72f is not established (false), and a data value "0" is set to the register.

The wink detection executing flag 72g is a flag for indicating whether or not the presence or absence of a wink is actually detected, and constructed by a one bit register, for example. In this embodiment, the wink detection executing flag (IsCheck) 72g is established for every constant time (ten frames), and a data value "1" is set to the register. At other times, the wink detection executing flag 72g is not established, and a data value "0" is set to the register.

The left eye processing flag 72h is a flag for indicating whether or not left eye wink processing is executed, and constructed by a one bit register, for example. The left eye processing flag (Lexe) 72h is established and a data value "1" is set to the register when a wink is detected, and it is determined that the left eye is closed. At other times, the left eye processing flag 72h is not established, and a data value "0" is set to the register.

The right eye processing flag 72i is a flag for indicating whether or not right eye wink processing is executed, and constructed by a one bit register, for example. The right eye processing flag (Rexe) 72i is established and a data value "1" is set to the register when a wink is detected, and it is determined that the right eye is closed. At other times, the right eye processing flag 72i is not established, and a data value "0" is set to the register.

Although illustration is omitted, other data such as image data, sound data, etc. and other flags, a counter, and the like are stored in the data memory area 72.

Figure 9:
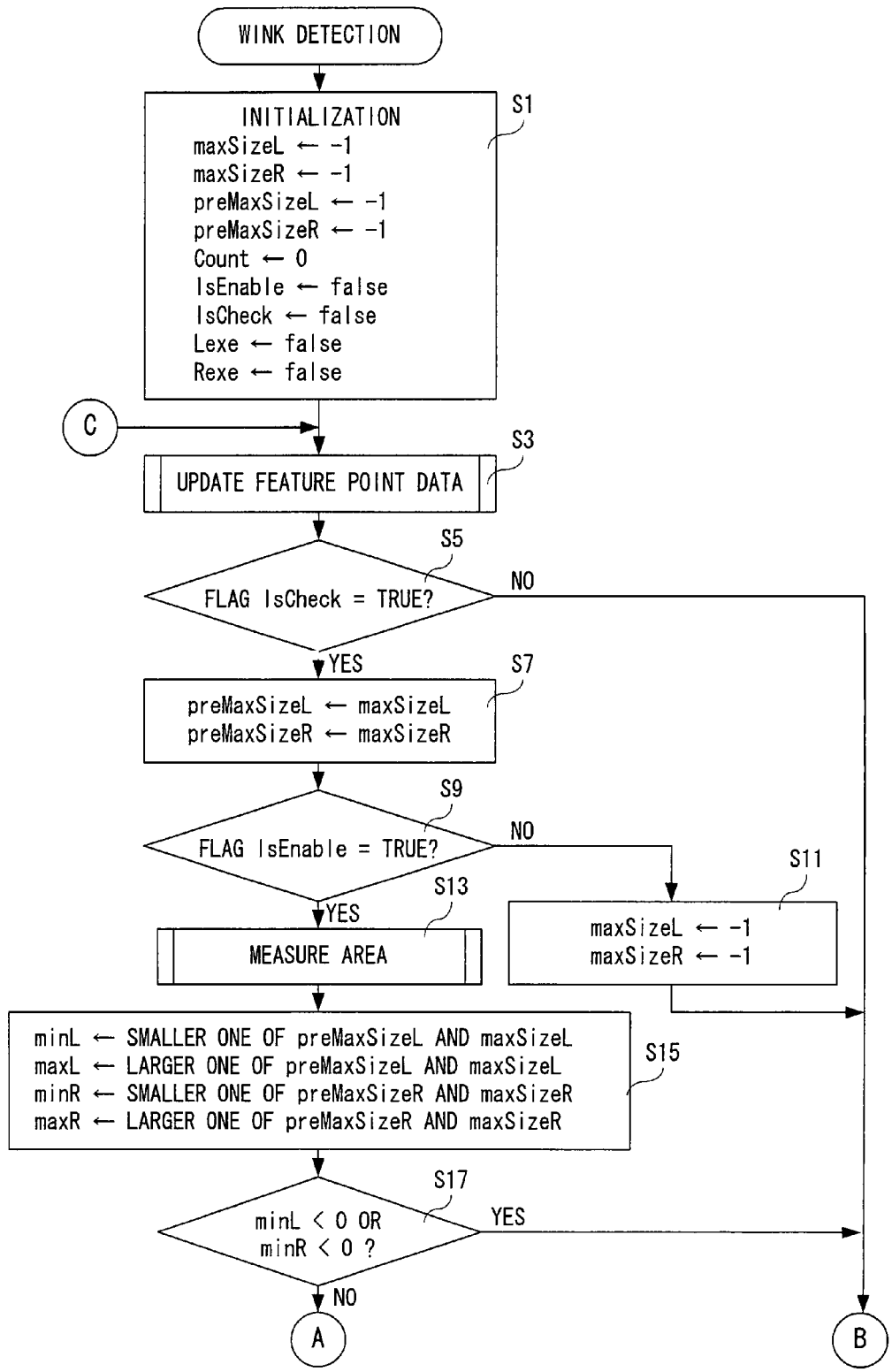
FIG. 9 is a flowchart showing a part of wink detecting processing of a CPU core shown in FIG. 2.
Figure 10:
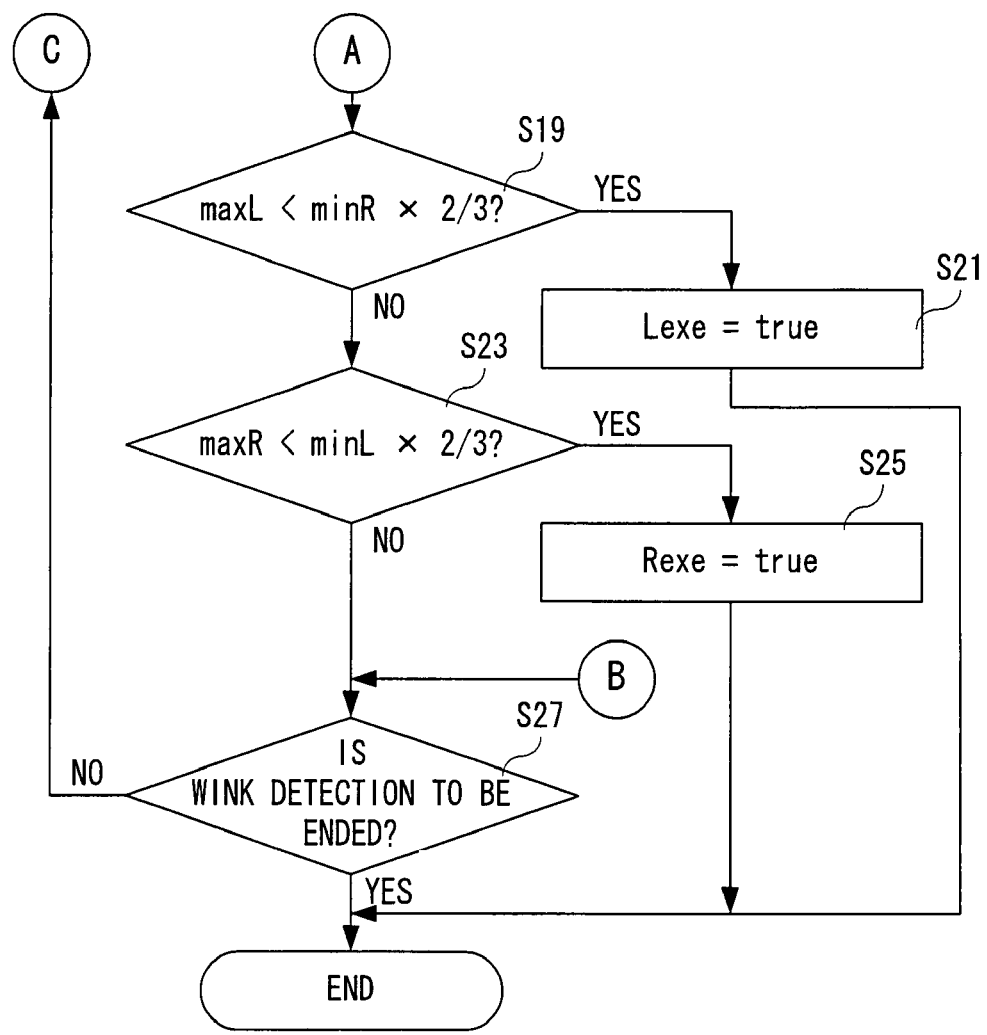
FIG. 10 is a flowchart continued from FIG. 9 showing another part of the wink detecting processing of the CPU core shown in FIG. 2.

More specifically, the CPU core 34 shown in FIG. 2 executes wink detecting processing shown in FIG. 9 and FIG. 10. As shown in FIG. 9, when starting wink detecting processing, the CPU core 34 initializes variables, counters and flags in a step S1. More specifically, an initial value (−1) is substituted in each of variables maxSizeL, maxSizeR, preMaxSizeL, and preMaxSizeR. It should be noted that the initial value (−1) of each of the variables means an invalid (value). Furthermore, an initial value (0) is substituted in the variable Count. Then, flags IsEnable, IsCheck, Lexe, and Rexe are set to initial values (false).

It should be noted that the variable maxSizeL is current area data of the black eye region of the left eye 72b, the variable maxSizeR is current area data of the black eye region of the right eye 72c, the variable preMaxSizeL is previous area data of the black eye region of the left eye 72d, and the variable preMaxSizeR is previous area data of the black eye region of the left eye 72e. Furthermore, the variable Count is a count value of the number of frames, and is reset (0) when it takes a constant value (9). As described above, the flag IsEnable is a feature point acquiring flag 72f for indicating whether or not the feature points Pi are acquired, the flag IsCheck is a wink detection executing flag 72g for indicating whether or not a wink detection is made, the flag Lexe is a left eye processing flag 72h for indicating whether or not left eye wink processing is executed, and the flag Rexe is a right eye processing flag 72i for indicating whether or not right eye wink processing is executed.

Next, in a step S3, feature point data updating processing (see FIG. 11) described later is executed. In a succeeding step S5, it is determined whether or not the flag IsCheck is true. That is, the CPU core 34 determines whether or not a wink is currently detected. If "NO" in the step S5, that is, if the flag IsCheck is false, it is determined that the wink is currently detected, and the process proceeds to a step S27 shown in FIG. 10. On the other hand, if "YES" in the step S5, that is, if flag IsCheck is true, it is determined that the wink is not currently detected, and in a step S7, the variable maxSizeL is substituted for the variable preMaxSizeL, and the variable maxSizeR is substituted for the variable preMaxSizeR. That is, the CPU core 34 stores the copy of the current area data of the black eye region of the left eye 72b as previous area data of the black eye region of the left eye 72d in the data memory area 72, and the copy of the current area data of the black eye region of the right eye 72c is stored as previous area data of the black eye region of the left eye 72e in the data memory area 72.

Then, in a step S9, it is determined whether or not the flag IsEnable is true. That is, the CPU core 34 determines whether or not the feature points Pi are acquired. If "NO" in the step S9, that is, if the flag IsEnable is false, it is determined that the feature points Pi cannot be acquired, −1 (invalid value) is assigned to each of the variable maxSizeL and the variable maxSizeR in a step S11, and the process proceeds to the step S27. On the other hand, if "YES" in the step S9, that is, if the flag IsEnable is true, it is determined that the feature points Pi are acquired, area measuring processing (see FIG. 12-FIG. 21) described later is executed in a step S13, and the process proceeds to a step S15.

In the step S15, smaller one of the variable preMaxSizeL and the variable maxSizeL is substituted in the variable minL, and a larger one of the variable preMaxSizeL and the variable maxSizeL is substituted in the variable maxL, a smaller one of the variable preMaxSizeR and the variable maxSizeR is substituted in the variable minR, and a larger one of the variable preMaxSizeR and the variable maxSizeR is substituted in the variable minR. In a next step S17, it is determined whether or not each of the variable minL or the variable minR is smaller than 0. That is, the CPU core 34 determines whether or not the variable minL or the variable minR is −1 (invalid value).

If "YES" in the step S17, that is, if the variable minL or the variable minR is smaller than 0, it is determined that a wink detection is impossible, and the process proceeds to the step S27. On the other hand, if "NO" in the step S17, that is, if the variables minL and the minR are more than 0, it is determined that wink detection is possible, and the process proceeds to a step S19 shown in FIG. 10.

As shown in FIG. 10, in the step S19, it is determined whether or not the variable maxL is smaller than the variable $minR \times 2/3$. That is, the CPU core 34 determines whether or not the left eye is closed. If "YES" in the step S19, that is, if the variable maxL is smaller than the variable $minR \times 2/3$, the flag Lexe relating to the left eye wink processing is set to be true in a step S21, and the wink detecting processing is ended. On the other hand, if "NO" in the step S19, that is, if the variable maxL is equal to or more than the variable $minR \times 2/3$, it is determined whether or not the variable maxR is smaller than the variable $minL \times 2/3$ in a step S23. That is, the CPU core 34 determines whether or not the right eye is closed.

If "YES" in the step S23, that is, if the variable maxR is smaller than the variable $minL \times 2/3$, the flag Rexe relating to the right eye wink processing is set to be true in a step S25, and the wink detecting processing is ended. On the other hand, if "NO" in the step S23, that is, if the variable maxR is equal to or more than the variable $minL \times 2/3$, it is determined whether or not the wink detection is to be ended in the step S27. Here, the CPU core 34 determines whether or not detection of the wink is to be ended according to an instruction by the user and an event of the application. If "NO" in the step S27, that is, if the wink detection is not be ended, the process returns to the step S3 shown in FIG. 9. On the other hand, if "YES" in the step S27, that is, if the wink detection is to be ended, the wink detecting processing is ended.

Although illustration is omitted, if the flag Lexe of the left eye wink processing or the flag Rexe of the right eye wink processing is true, processing according to the wink is executed in the application as described with reference to the FIG. 4 and FIG. 5.

Furthermore, although the equations used in the determination processing in the steps S19 and S23 is empirically obtained, there is not need of being restricted thereto. It may be noted that a wink is detected by a ratio between the area of the black eye region of the left eye and the area of the black eye region of the right eye.

Figure 11:
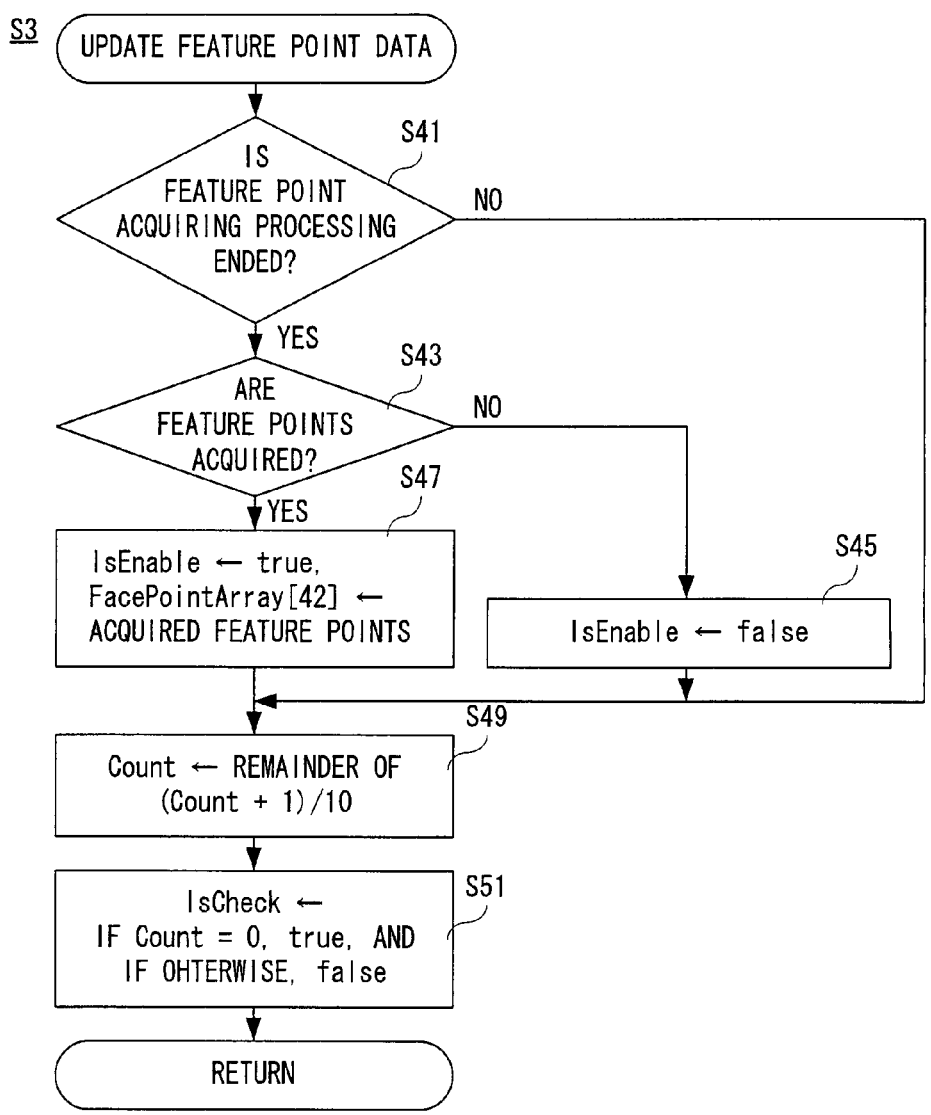
FIG. 11 is a flowchart showing feature point data updating processing of the CPU core shown in FIG. 2.

FIG. 11 is a flowchart showing the feature point data updating processing shown in the step S3 in FIG. 9. Referring to FIG. 11, when starting the feature point data updating processing, the CPU core 34 determines whether or not the feature point acquiring processing is ended in a step S41. Although illustration is omitted, when the wink detecting processing is started to thereby execute the initialization processing (S1), the feature point acquiring processing is also started. The feature point acquiring processing is executed separately from the wink detecting processing.

If "NO" in the step S41, that is, if the feature point acquiring processing is not ended, the process directly proceeds to a step S49. On the other hand, if "YES" in the step S41, that is, if the feature point acquiring processing is ended, it is determined whether or not the feature points Pi are acquired in a step S43. That is, the CPU core 34 determines whether or not the feature point data 72a is stored (updated) in the RAM 42 as a result of the feature point acquiring processing.

If "NO" in the step S43, that is, if the feature points Pi are not acquired, it is determined that acquiring (updating) the feature points is unsuccessful, the flag IsEnable is set to be false in a step S45, and the process proceeds to the step S49. On the other hand, if "YES" in the step S43, that is, if the feature points Pi are acquired, the flag IsEnable is set to be true in a step S47, the coordinates of the acquired feature points Pi (i=1-42) are substituted in the Face Point Array [42], and the process proceeds to the step S49.

In the step S49, the remainder obtained by dividing (variable Count+1) by 10 is substituted in the variable Count. In this embodiment, in order to detect a wink for every 10 frames, the value obtained by adding 1 to the variable Count is divided by 10. That is, if the remainder is 0, this means that 10 frames elapse from the previous detection of the wink (or from the start of the wink detecting processing). Then, in a step S51, in a case that the variable Count is 0, the flag IsCheck is set to be true, and except when the variable Count is 0, the flag IsCheck is set to be false, and the process returns to the wink detecting processing.

Figure 12:
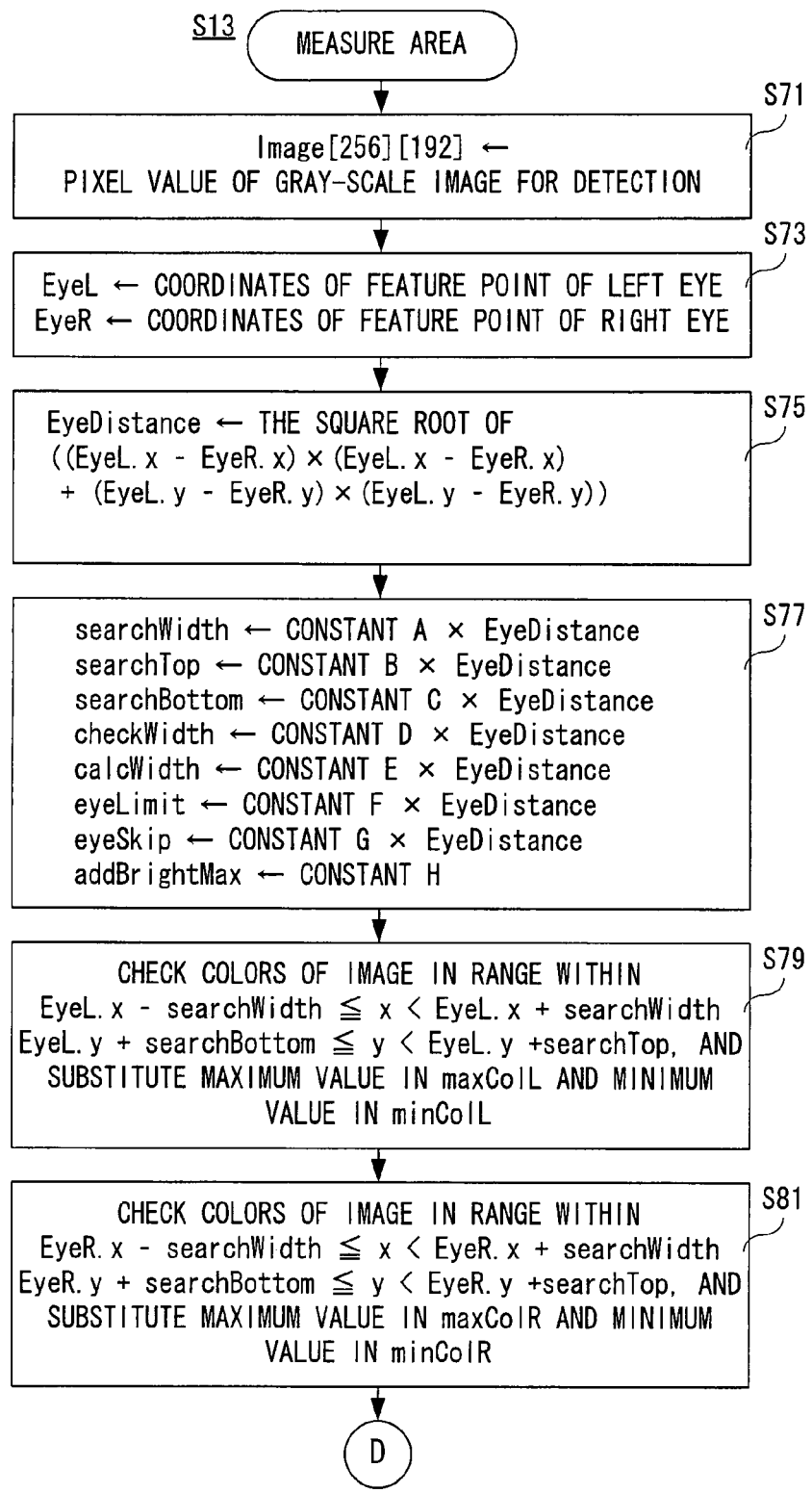
FIG. 12 is a flowchart showing a first part of area measuring processing of the CPU core shown in FIG. 2.
Figure 21:
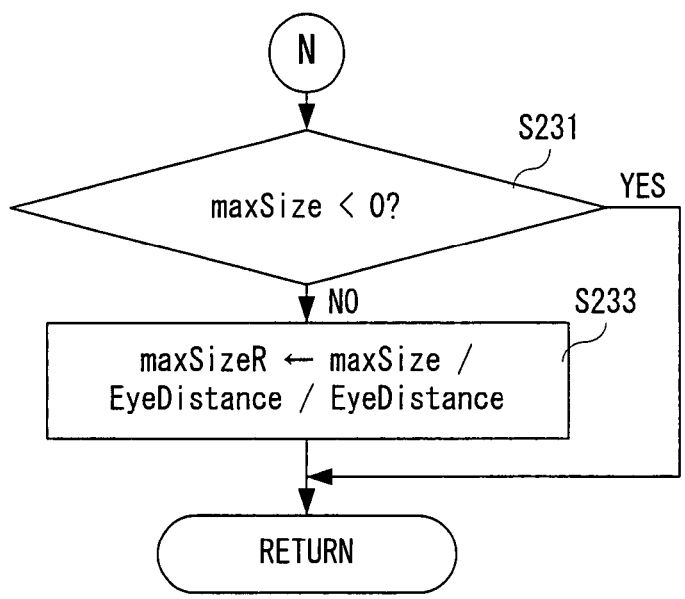
FIG. 21 is a a flowchart continuing from FIG. 20 showing a tenth part of the area measuring processing of the CPU core shown in FIG. 2.

FIG. 12 or FIG. 21 is a flowchart showing the area measuring processing in the step S13 shown in FIG. 9. As shown in FIG. 12, when starting the area measuring processing, the CPU core 34 captures a gray-scale image (256×192 dots) for detection in a step S71, and pixels of the gray-scale image are substituted in the pixel values Image [256][192]. That is, the CPU core 34 captures the gray-scale image the same size as the LCD 14 (or LCD 12). For example, 5 bits (32 tones) of gray-scale image is captured. It should be noted that the gray-scale image is not restricted to 5 bits, and may be lower (low gray-scale) or higher than (high gray-scale) 5 bits.

In a succeeding step S73, coordinates of the feature point of the left eye (x, y) are substituted in a variable EyeL, and coordinates of the feature point of the right eye (x, y) are substituted in a variable EyeR. It should be noted that in the step S73, the feature point (EyeL) of the left eye is the central point P13 of the black eye region of the left eye, and the feature point (EyeR) of the right eye is the central point P22 of the black eye region of the right eye.

In the area measuring processing from that time forward, local coordinates are used taking the respective central points P13 and P22 of the left eye and the right eye as origins. As to each of the local coordinates, the right direction of the drawing is a plus direction of the X-axis, and the upper direction of the drawing is a plus direction of the Y-axis.

In a next step S75, $\sqrt{\{(EyeL.x-EyeR.x)^2+(EyeL.y-EyeR.y)^2\}}$ is substituted in a variable EyeDistance. Here, the variable EyeDistance is a distance between the center of the black eye region of the left eye and the center of the black eye region of the right eye. Furthermore, a variable EyeL.x is an X coordinate of the coordinates of the feature point of the left eye (variable EyeL), and a variable EyeL.y is a Y coordinate of the coordinates of the feature point of the left eye (variable EyeL), EyeR.x is an X coordinate of the coordinates of the feature point of the right eye (variable EyeR), and EyeR.y is a Y coordinate of the coordinates of the feature point of the right eye (variable EyeR). Hereafter, the same is true for the following.

Succeedingly, in a step S77, various variables are defined by utilizing the variable EyeDistance acquired in the step S75, and so forth. Specifically, a constant A×EyeDistance is set to a variable searchWidth, a constant B×EyeDistance is set to a variable searchTop, and a constant C×EyeDistance is set to a variable searchBottom. Also, a constant D×EyeDistance is set to a variable checkWidth, a constant E×EyeDistance is set to a variable calcWidth, a constant F×EyeDistance is set to a variable eyeLimit, a constant G×EyeDistance is set to a variable eyeSkip, and a constant H is set to a variable addBrightMax.

The variable searchWidth is a variable for defining a range (width) in a horizontal direction (X-axis direction) within the range for detecting the blackest color and the brightest color. The variable searchTop is a variable for defining the upper half of the range in a vertical direction (Y-axis direction) within the range for detecting the blackest color and the brightest color. The variable searchBottom is a variable for defining the lower half of the range in the Y-axis direction within the range for detecting the blackest color and the brightest color, and represented by a negative number. As shown in FIG. 22(A), each of the variable searchWidth, the variable searchTop and the variable searchBottom defines a range (color detection range) for detecting the blackest color and the brightest color with reference to the eyeL of the eye (left eye, here) as described above.

Additionally, the variable checkWidth is a variable for defining a range in the X-axis direction within the range for detecting a place with the largest area as to the black area. The variable calcWidth is a variable for defining a width in the X-axis direction to calculate the area as to the blacked area. The variable eyeLimit is a variable of indicating a threshold value for determining whether detection of the blacked area is impossible or not in a case that black pixels are continuous in the Y-axis direction (vertically). The variable eyeSkip is a variable indicating a threshold value for determining whether black pixels are continuous is regarded in a case that white pixels are continuous in the Y-axis direction. The variable addBrightMax is a variable for indicating a maximum value of a correction value for correcting brightness in a case that the brightness of the surroundings of the right and left eyes are different.

In addition, in this embodiment, "7" is set to the constant A, "3" is set to the constant B, "−8" is set to the constant C, "10" is set to the constant D, "5" is set to the constant E, "40" is set to the constant F, "2" is set to the constant G, and "17" is set to the constant H.

Returning to FIG. 12, in a step S79, out of the pixel value image, the colors within the range indicated by Equation 1 are checked, a maximum value is substituted in a variable maxColL, and a minimum value is substituted in a variable minColL. That is, the brightest color (maxColL) and the darkest color (minColL) of the surrounding of the left eye are detected.

$$EyeL.x-searchWidth \leq x < EyeL.x+searchWidth$$

$$EyeL.y+searchBottom \leq y < EyeL.y+searchTop \quad \text{[Equation 1]}$$

Furthermore, in a step S81, out of the pixel value image, the colors within the range indicated by Equation 2 are checked, a maximum value is substituted in a variable maxColR, and a minimum value is substituted in a variable minColR. That is, the brightest color (maxColR) and the darkest color (minColR) of the surrounding of the right eye are detected.

$$EyeR.x-searchWidth \leq x < EyeR.x+searchWidth$$

$$EyeR.y+searchBottom \leq y < EyeR.y+searchTop \quad \text{[Equation 2]}$$

Figure 13:
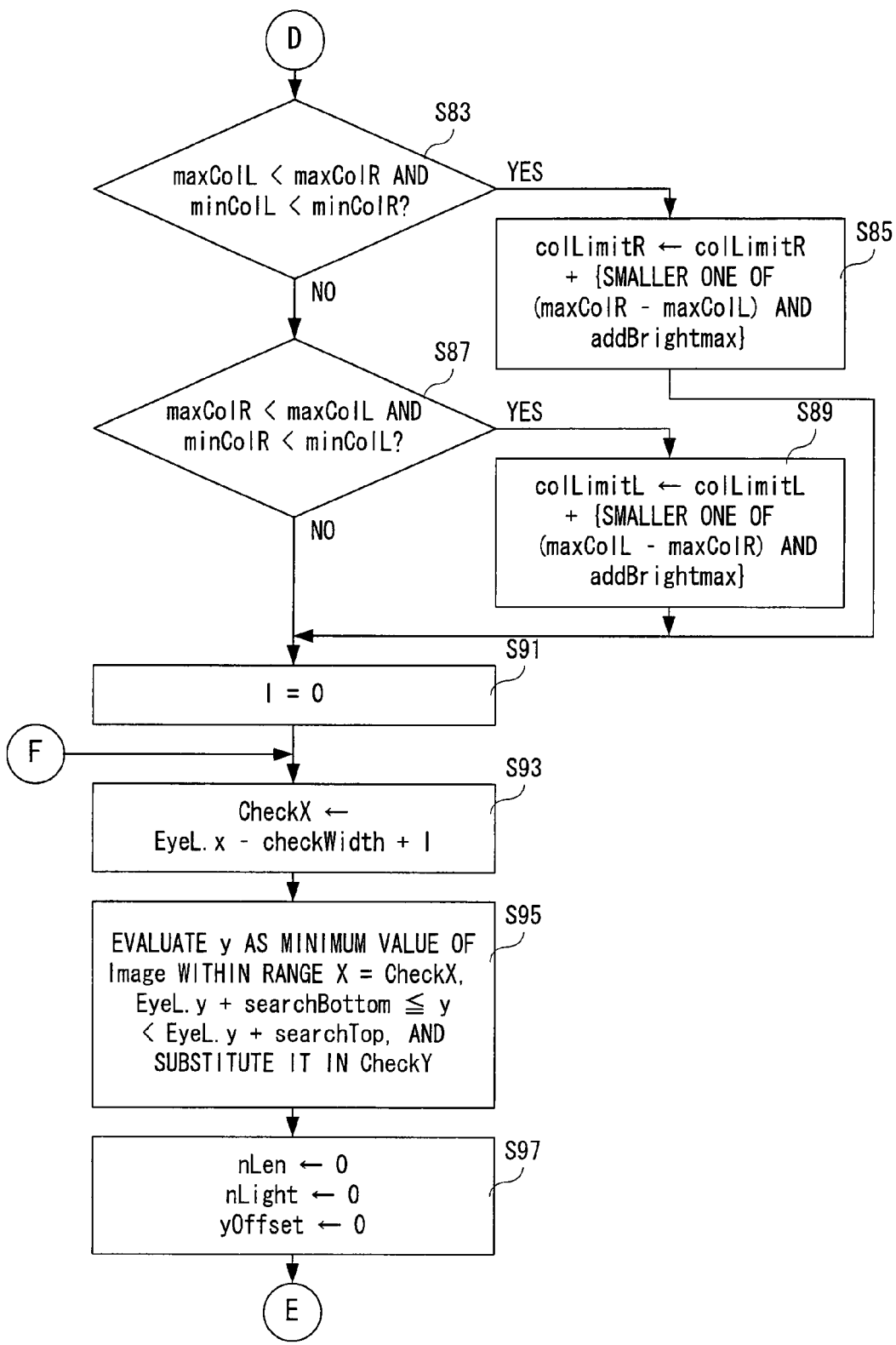
FIG. 13 is a flowchart continuing from FIG. 12 showing a second part of the area measuring processing of the CPU core shown in FIG. 2.

As shown in FIG. 13, in a next step S83, it is determined whether or not each of the variable maxColL, the variable minColL, the maxColR, and the minColR acquired in the step S79 and the step S81 satisfies Equation 3. That is, the CPU core 34 determines whether or not the pixel value of the brightest color of the left eye is smaller than that of the brightest color of the right eye, and the pixel value of the darkest color of the left eye is smaller than that of the darkest color of the right eye.

$$maxColL < maxColR \text{ and } minColL < minColR \quad \text{[Equation 3]}$$

If "YES" in the step S83, that is, if Equation 3 is satisfied, it is determined that the surrounding of the right eye is brighter than the surrounding of the left eye, and colLimitR+ {smaller one of (maxColR−maxColL) and addBrightmax} is substituted in the variable colLimitR in a step S85, and then, the process proceeds to a step S91. That is, a threshold value for determining whether the black part or the white part when the area of the black eye region of the right eye is measured is corrected. Here, the reason why the smaller one of (maxColR−maxColL) and addBrightmax is added to the variable of colLimitR in the step S85 is to prevent the threshold values for determining a black part or a white part from being extremely different between the right eye and the left eye by regarding the upper limit of the correction width as addBrightmax.

On the other hand, if "NO" in the step S83, that is, if Equation 3 is not satisfied, it is determined that the surrounding of the left eye is brighter than the surrounding of the right eye, or the surrounding of the left eye is as bright as the surrounding of the right eye, and in a step S87, it is determined whether or not Equation 4 is satisfied. That is, the CPU core 34 determines that the pixel value of the brightest color of the right eye is smaller than that of the brightest color of the left eye, and the pixel value of the darkest color of the right eye is smaller than that of the darkest color of the left eye.

$$\text{maxColR} < \text{maxColL and minColR} < \text{minColL} \quad \text{[Equation 4]}$$

If "NO" in the step S87, that is, if Equation 4 is not satisfied, it is determined that the surrounding of the left eye is as bright as the surrounding of the right eye, and the process proceeds to the step S91. On the other hand, if "YES" in the step S87, that is, if Equation 4 is satisfied, the surrounding of the left eye is brighter than the surrounding of the right eye, and colLimitL+{smaller one of (maxColL−maxColR) or addBrightmax} is substituted in the variable colLimitL in a step S89, and then, the process proceeds to the step S91. That is, a threshold value for determining whether the black part or the white part when the area of the black eye region of the left eye is measured is corrected. The reason why the smaller one of (maxColL−maxColR) and addBrightmax is added to the variable colLimitL in the step S89 is to prevent the threshold values for determining a black part or a white part from being extremely different between the right eye and the left eye by regarding the upper limit of the correction width as addBrightmax.

Thus, the reason why the CPU core 34 corrects the brightness of the surrounding of the left eye or the brightness of the surrounding of the right eye is to cover individual variations (individual differences) and differences (variations) of the photographing condition (environment) and hence to accurately detect a wink. Additionally, in this embodiment, in order to accurately determine the difference in the brightness, the determination is performed on the basis of both of the brightest color and the darkest color of the surrounding of the left eye and the surrounding of the right eye. However, by comparing the brightest colors or the darkest colors, it is possible to determine brightness.

After completion of correcting the threshold value depending on the difference in the brightness, the CPU core 34 measures an area of the black eye region of the left eye (S91-S161) in the step S91 and onward, and then measures an area of the black eye region of the right eye (S163-S233).

FIG. 22(B) shows a scanning range (area scanning range) in a case that the area of the black eye region of the left eye is measured. The area scanning range is an area for searching the area of the black eye region (search region), and defined by the above-described variables checkWidth, searchTop and searchBottom. Although it is difficult to understand from FIG. 22(B), for scanning, the scanning direction is directed to both of the upper and lower directions regarding the pixel with the darkest color as the center, and from the left edge (N=1) of the area scanning range, for example, the number of black dots successively arranged in the vertical direction is counted. This is repeated for each line, and executed until the right edge, that is, the last line (N=2*checkWidth−1). Then, the total number of the number of dots successively arranged in all the lines in the up and down directions is determined to be the area of the black eye region. Although illustration is omitted, the same is true for measuring the area of the black eye region of the right eye. A detailed processing is described below by means of flowcharts.

As shown in FIG. 13, in the step S91, a variable I (the number of lines to be scanned) is initialized (I=0). In a succeeding step S93, EyeL.x−checkWidth+I is substituted in a variable CheckX. That is, a starting position (x-coordinate) of the scanning is set. Next, in a step S95, a minimum value y within the range shown in Equation 5 is acquired from the pixel value image, and the value is substituted in a variable CheckY. It should be noted that the variable CheckX is an X coordinate of a notable pixel, the variable CheckY is a Y coordinate of the notable pixel, and from the pixels within the range, a Y coordinate of the pixel with the darkest color is evaluated.

$$X = \text{CheckX}$$

$$\text{EyeL}.y + \text{searchBottom} \leq Y < \text{EyeL}.y + \text{searchTop} \quad \text{[Equation 5]}$$

Figure 14:
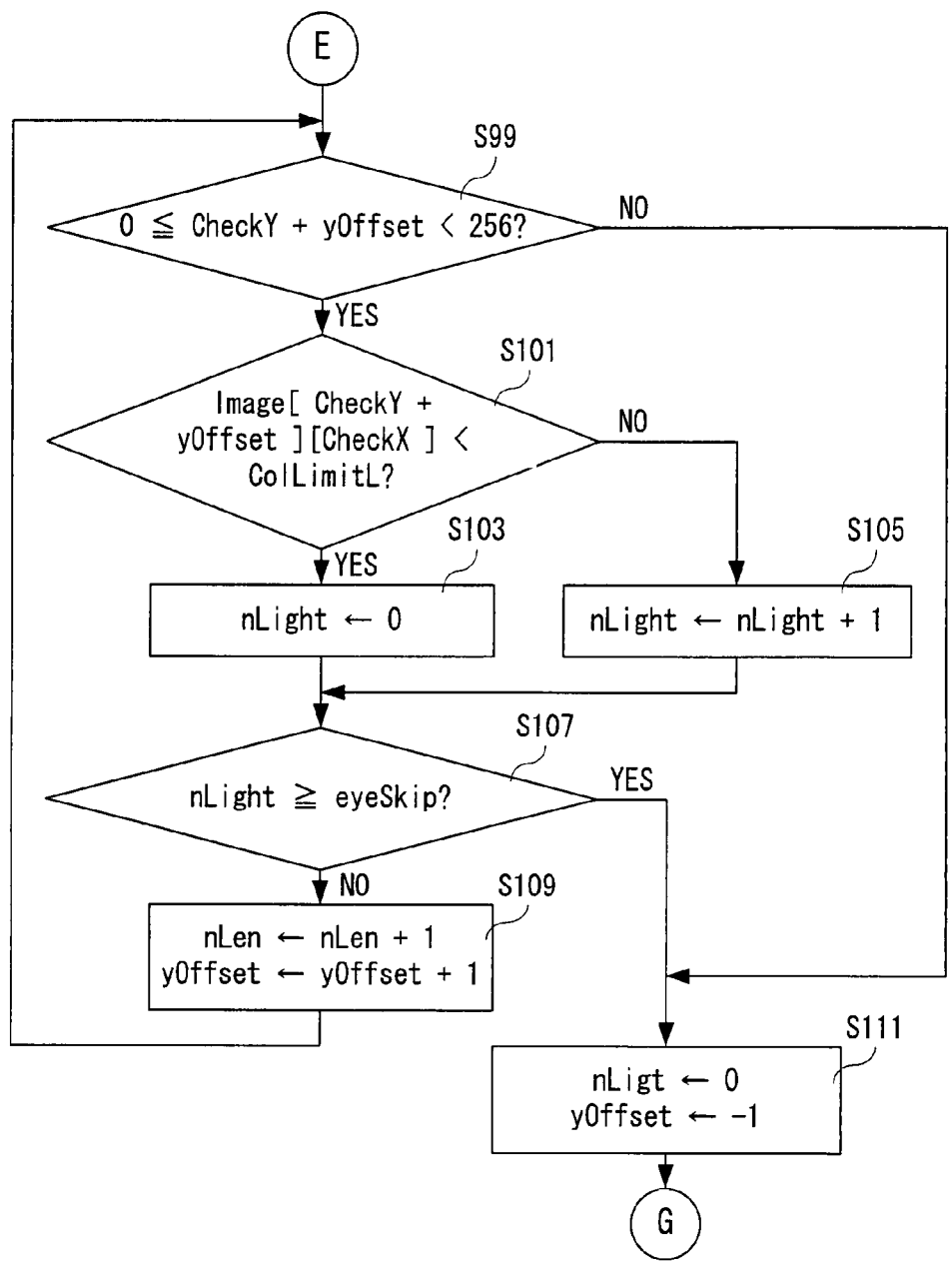
FIG. 14 is a flowchart continuing from FIG. 13 showing a third part of the area measuring processing of the CPU core shown in FIG. 2.
Figure 15:
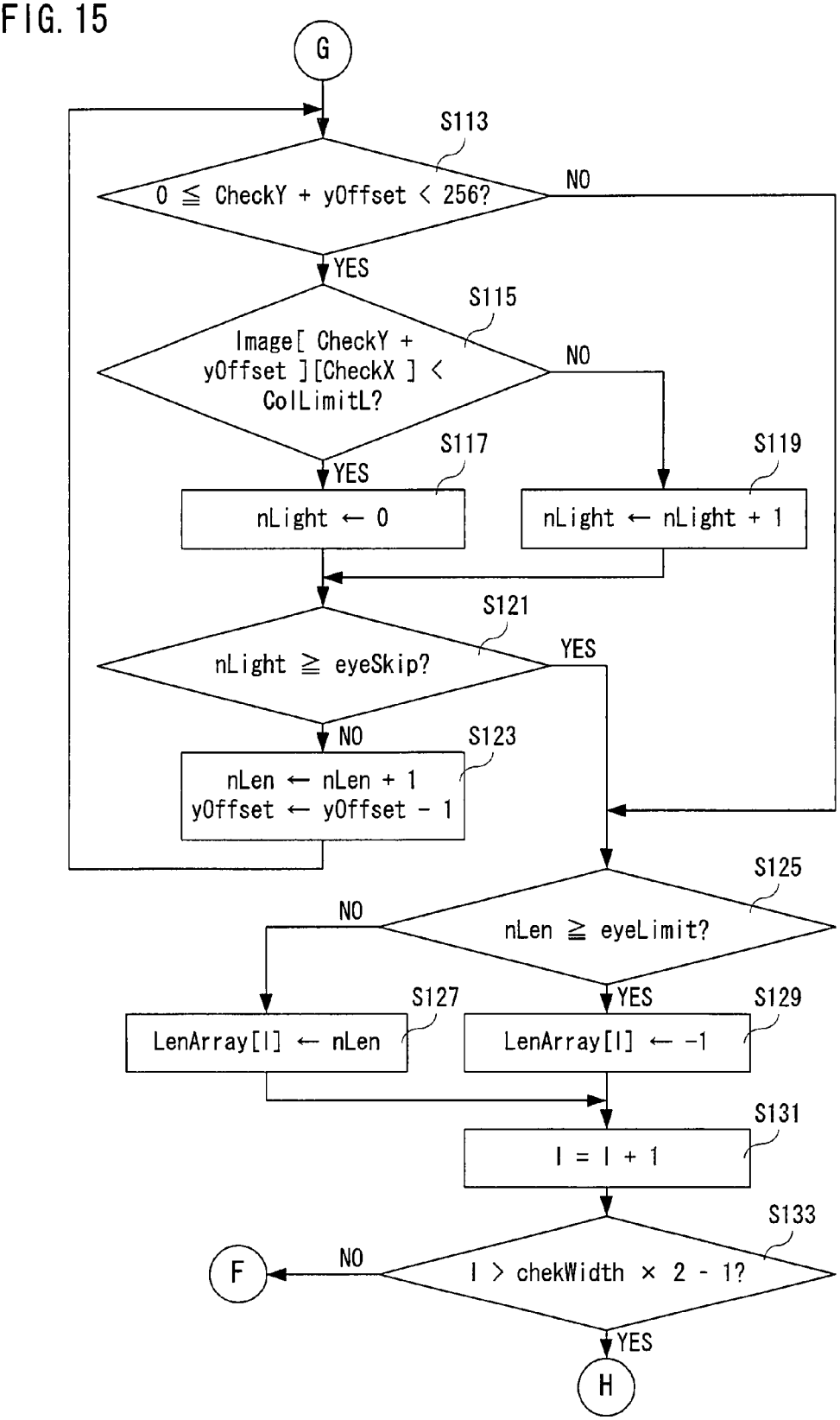
FIG. 15 is a flowchart continuing from FIG. 14 showing a fourth part of the area measuring apparatus of the CPU core shown in FIG. 2.
Figure 16:
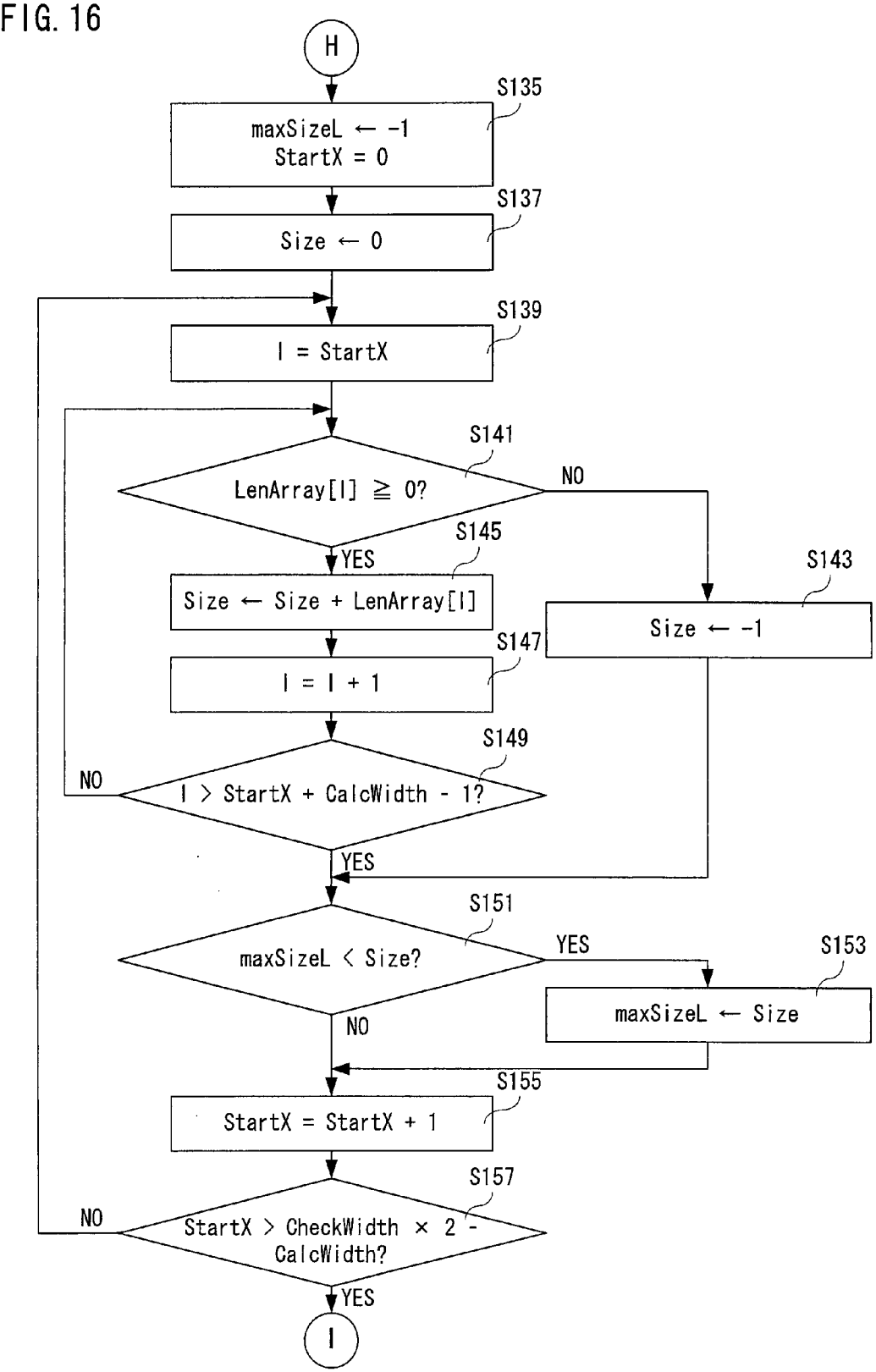
FIG. 16 is a flowchart continuing from FIG. 15 showing a fifth part of the area measuring processing of the CPU core shown in FIG. 2.
Figure 17:
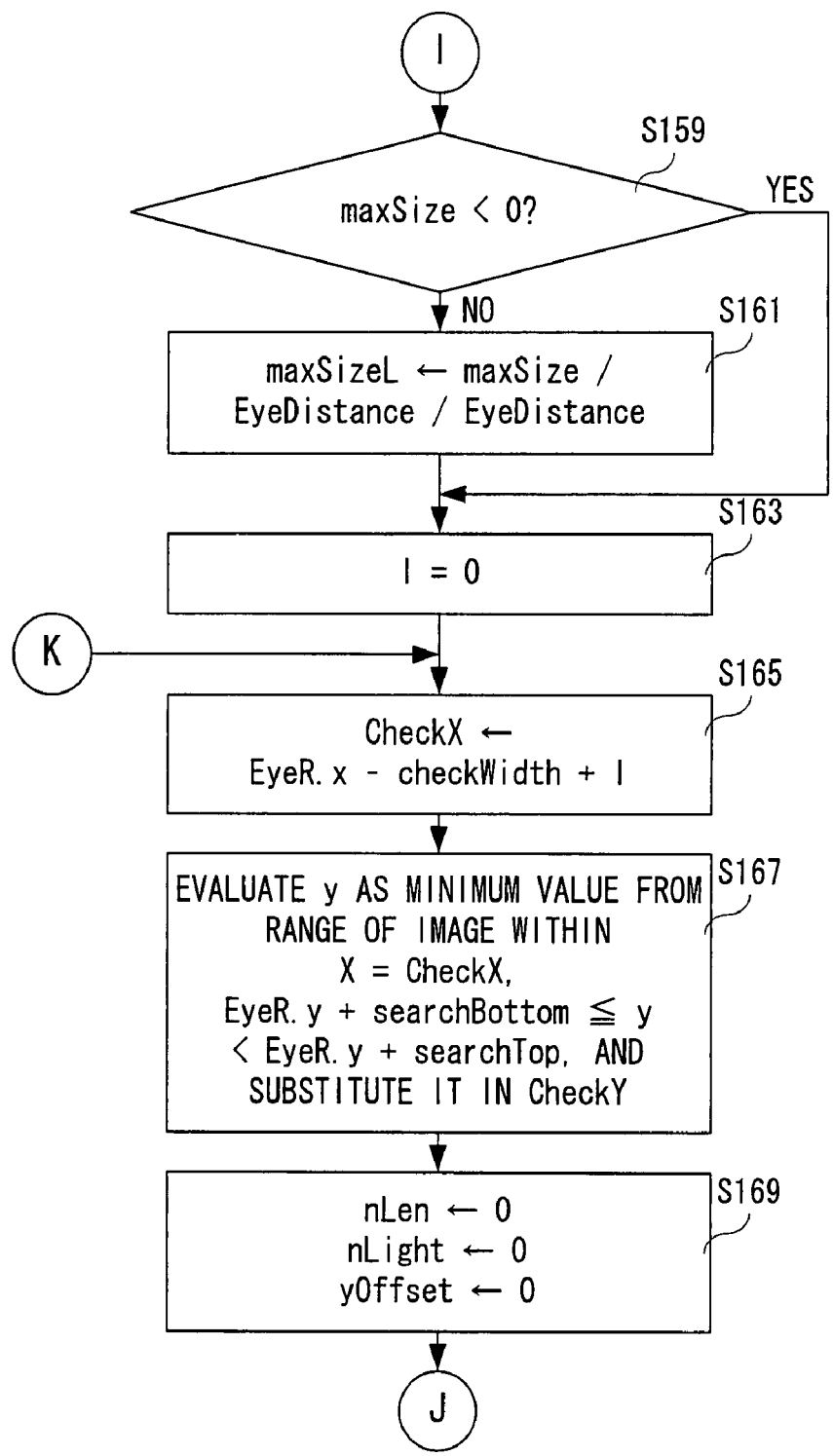
FIG. 17 is a flowchart continuing from FIG. 16 showing a sixth part of the area measuring processing of the CPU core shown in FIG. 2.

In a next step S97, an initial value (0) is set to each of variables nLen, nLight and yOffset and in a step S99 shown in FIG. 14, it is determined whether or not Equation 6 is satisfied. Here, the variable nLen is a variable for indicating the number of black dots successively arranged in the vertical direction. The variable nLight is a variable indicating the number of dots in bright color successively arranged in the vertical direction. In addition, the variable yOffset is a variable for a subroutine (S99-S109). That is, the CPU core 34 determines whether or not the variable CheckY is within the area scanning range according to Equation 6.

$$0 \leq \text{CheckY} + y\text{Offset} < 256 \quad \text{[Equation 6]}$$

If "NO" in the step S99, that is, if Equation 6 is not satisfied, it is determined that the variable CheckY is out of the area scanning range, and the process proceeds to a step S111. On the other hand, if "YES" in the step S99, that is, if Equation 6 is satisfied, it is determined that the variable CheckY is within the area scanning range, and in a step S101, it is determined that Equation 7 is satisfied. That is, it is determined whether or not the pixel value Image [CheckY+yOffset][CheckX] of the notable pixel (dots) is a black part or a white part.

$$\text{Image}[\text{CheckY} + y\text{Offset}][\text{CheckX}] < \text{colLimitL} \quad \text{[Equation 7]}$$

If "YES" in the step S101, that is, if Equation 7 is satisfied, it is determined that the notable pixel (dot) is a black part, a variable nLight is initialized (nLight=0) in a step S103, and the process proceeds to a step S107. On the other hand, if "NO" in the step S101, that is, if Equation 7 is not satisfied, the notable pixel (dot) is a white part, the variable nLight is incremented (nLight←nLight+1) in a step S105, and the process proceeds to the step S107.

In the step S107, it is determined whether or not Equation 8 is satisfied. That is, by determining whether or not it is equal to or more than a threshold value (variable eyeSkip) for regarding the number of white parts successively arranged in the vertical direction (variable nLight) as a black part, whether the white part except for the black eye or not is determined.

$$\text{nLight} \geq \text{eyeSkip} \quad \text{[Equation 8]}$$

If "NO" in the step S107, that is, if Equation 8 is not satisfied, the variable nLen is incremented (nLen←nLen+1), and the variable yOffset is incremented (yOffset←yOffset+1) in a step S109, and the process returns to the step S99. That is, a next pixel is searched as to whether the black part or not. On the other hand, if "YES" in the step S107, that is, if Equation 8 is satisfied, it is determined to be the white part except for the black eye, in order to scan the pixels at the lower part of the area scanning range, the variable nLingt is initialized (nLingt←0) and the variable yOffset is initialized (yOffset←−1) in a step S111, and it is determined whether or not the foregoing Equation 6 is satisfied in a step S113 shown in FIG. 15. That is, it is determined whether or not the variable CheckY is within the area scanning range.

If "NO" in the step S113, that is, if Equation 6 is not satisfied, the process directly proceeds to a step S125 as it is. On the other hand, if "YES" in the step S113, that is, if Equation 6 is satisfied, it is determined whether or not the foregoing Equation 7 is satisfied in a step S115. That is, it is determined whether the notable pixel is the black part or the white part. If "YES" in the step S115, that is, if Equation 7 is satisfied, the notable pixel is the black part, and the variable nLight is initialized (nLight=0) in a step S117, and the process proceeds to a step S121. On the other hand, if "NO" in the step S115, that is, if Equation 7 is not satisfied, it is determined that the notable pixel is the white part, the variable nLight is incremented (nLight←nLight+1) in a step S119, and the process proceeds to the step S121.

In the step S121, it is determined whether or not the foregoing Equation 8 is satisfied. That is, it is determined whether the notable pixel is the white part except for the black eye. If "NO" in the step S121, that is, if Equation 8 is not satisfied, the variable nLen is incremented(nLen←nLen+1), and the variable yOffset is decremented (yOffset←yOffset−1) in a step S123, and the process returns to the step S113. That is, search is performed on the next pixel as to whether the black part or not. On the other hand, if "YES" in the step S121, that is, if Equation 8 is satisfied, it is determined to be the white part except for the black eye, and the process proceeds to a step S125.

In the step S125, it is determined whether or not Equation 9 is satisfied. This is a process for invalidating an undesired search result such as hanged eyes by hair, closed eyes with long eyelash, etc. by determining whether or not the variable nLen exceeds the variable eyeLimit. That is, for an undesired case, the variable nLen counted as a part of the black eye is excluded from the measurement of the area.

$$nLen \geq eyeLimit \qquad \text{[Equation 9]}$$

If "NO" in the step S125, that is, if Equation 9 is not satisfied, it is determined to be the black part, the value of the variable nLen is substituted in the variable LenArrey[I] in a step S127, and the process proceeds to a step S131. That is, in the line (I line) currently searched, the number of pixels (LenArrey[I]) is stored as the black part successively arranged. On the other hand, if "YES" in the step S125, that is, if Equation 9 is satisfied, it is determined to be the black part except for the black eye, −1 (invalid value) is substituted in the variable LenArrey[I] in a step S129, and the process proceeds to the step S131.

In the step S131, the variable I is incremented (I=I+1). Then, in a step S133, it is determined whether or not Equation 10 is satisfied. That is, it is determined whether or not scanning is performed on the entire area scanning range.

$$I > checkWidth \times 2 - 1 \qquad \text{[Equation 10]}$$

If "NO" in the step S133, that is, if Equation 10 is not satisfied, the process returns to the step S93 shown in FIG. 13 to scan the next line. On the other hand, if "YES" in the step S133, that is, if Equation 10 is satisfied, it is determined that the entire area scanning range is scanned, and in a step S135 shown in FIG. 16, a variable maxSizeL is initialized (maxSizeL←−1) and a variable StartX is initialized (StartX=0). Succeedingly, in a step S137, a variable Size is initialized (Size←0), and in a step S139, the variable StartX is substituted in the variable I.

Here, the variable maxSizeL is a maximum value of the sum (Size) of the area. Furthermore, the variable StartX is a variable for a subroutine (S139-S157). In addition, the variable Size is a sum of the area corresponding to the variable chalcWidth.

Then, in a step S141, it is determined whether or not Equation 11 is satisfied. That is, it is determined whether or not the variable LenArray[I] is not invalidated.

$$LenArray[I] \geq 0 \qquad \text{[Equation 11]}$$

If "NO" in the step S141, that is, if Equation 11 is not satisfied, an invalid value (−1) is substituted in the variable Size in a step S143, and the process proceeds to a step S151. Thus, even if only one example includes an invalid value, the current area measuring processing is invalidated. On the other hand, if "YES" in the step S141, that is, if Equation 11 is satisfied, the Size+LenArray[I] is substituted in the variable Size in a step S145, the variable I is incremented (I=I+1) in a step S147, and the process proceeds to a step S149. In the step S149, it is determined whether or not Equation 12 is satisfied. That is, it is determined whether or not the variable I is out of the area scanning range.

$$I > StartX + calcWidth - 1 \qquad \text{[Equation 12]}$$

If "NO" in the step S149, that is, if Equation 12 is not satisfied, the process returns to the step S141. On the other hand, if "YES" in the step S149, that is, if Equation 12 is satisfied, the process proceeds to the step S151. In the step S151, it is determined whether or not Equation 13 is satisfied. That is, it is determined whether or not the maximum value of the sum of the area is smaller than the sum of the area currently calculated.

$$maxSizeL < Size \qquad \text{[Equation 13]}$$

If "YES" in the step S151, that is, if Equation 13 is satisfied, the variable Size is substituted in the variable maxSizeL in a step S153, and the process proceeds to a step S155. On the other hand, if "NO" in the step S151, that is, if Equation 13 is not satisfied, the variable StartX is incremented (StartX=StartX+1) in a step S155. Then, in a step S157, it is determined whether or not Equation 14 is satisfied. That is, it is determined whether or not the variable StartX is out of the area scanning range.

$$StartX > checkWidth \times 2 - calcWidth \qquad \text{[Equation 14]}$$

If "NO" in the step S157, that is, if Equation 14 is not satisfied, the process returns to the step S139. On the other hand, if "YES" in the step S157, that is, if Equation 14 is satisfied, it is determined whether or not the variable maxSize is less than 0 in a step S159 shown in FIG. 17. That is, it is determined whether or not the maximum value of the sum of the area is invalid.

If "YES" in the step S159, that is, if the variable maxSize is less than 0, the process directly proceeds to a step S163. On the other hand, if "NO" in the step S159, that is, if variable maxSize is equal to or more than 0, the variable maxSizeL is normalized in a step S161. This is because that the value is transformed to be a value independent from a contraction scale of the photographed facial image. More specifically, the variable maxSizeL is normalized according to Equation 15.

$$maxSizeL = maxSizeL / EyeDistance / EyeDistance \qquad \text{[Equation 15]}$$

Thus, the area of the black eye region of the left eye is obtained. Although the area of the black eye region of the right eye is obtained below, the measuring method is approximately the same as that of the area of the black eye region of the left eye as described above, and therefore, a duplicated description will be briefly explained.

Returning to FIG. 17, in the step S163, the variable I is initialize (I=0). In a succeeding step S165, EyeR.x−checkWidth+I is substituted in the variable checkX. Next, in a step S167, y is obtained as a minimum value from the range of the pixel value shown in Equation 16, and substituted in the variable checkY.

X=CheckX $$EyeR.y+\text{searchBottom} \leqq Y \leqq EyeR.y+\text{searchTop} \quad \text{[Equation 16]}$$

Figure 18:
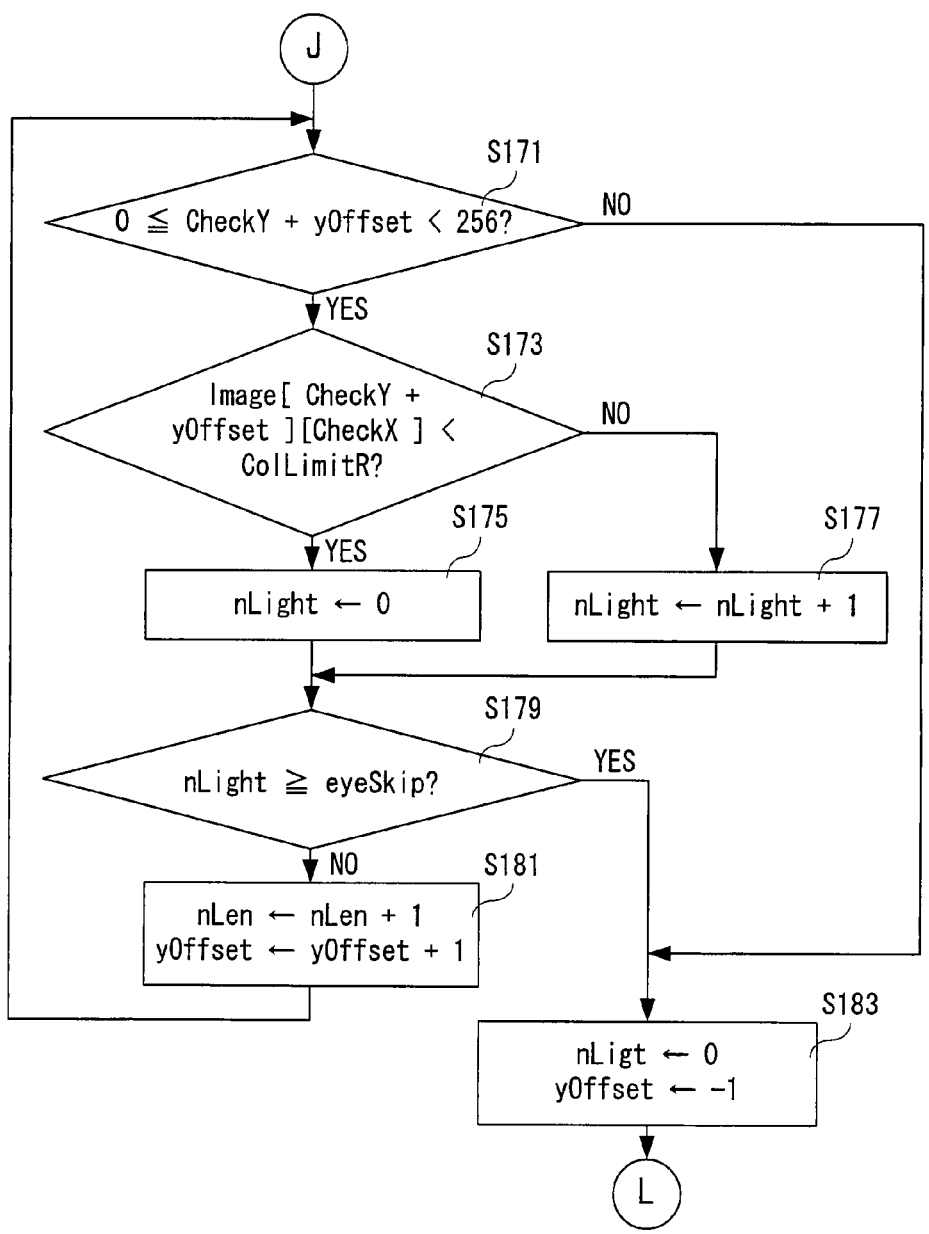
FIG. 18 is a flowchart continuing from FIG. 17 showing a seventh part of the area measuring processing of the CPU core shown in FIG. 2.
Figure 19:
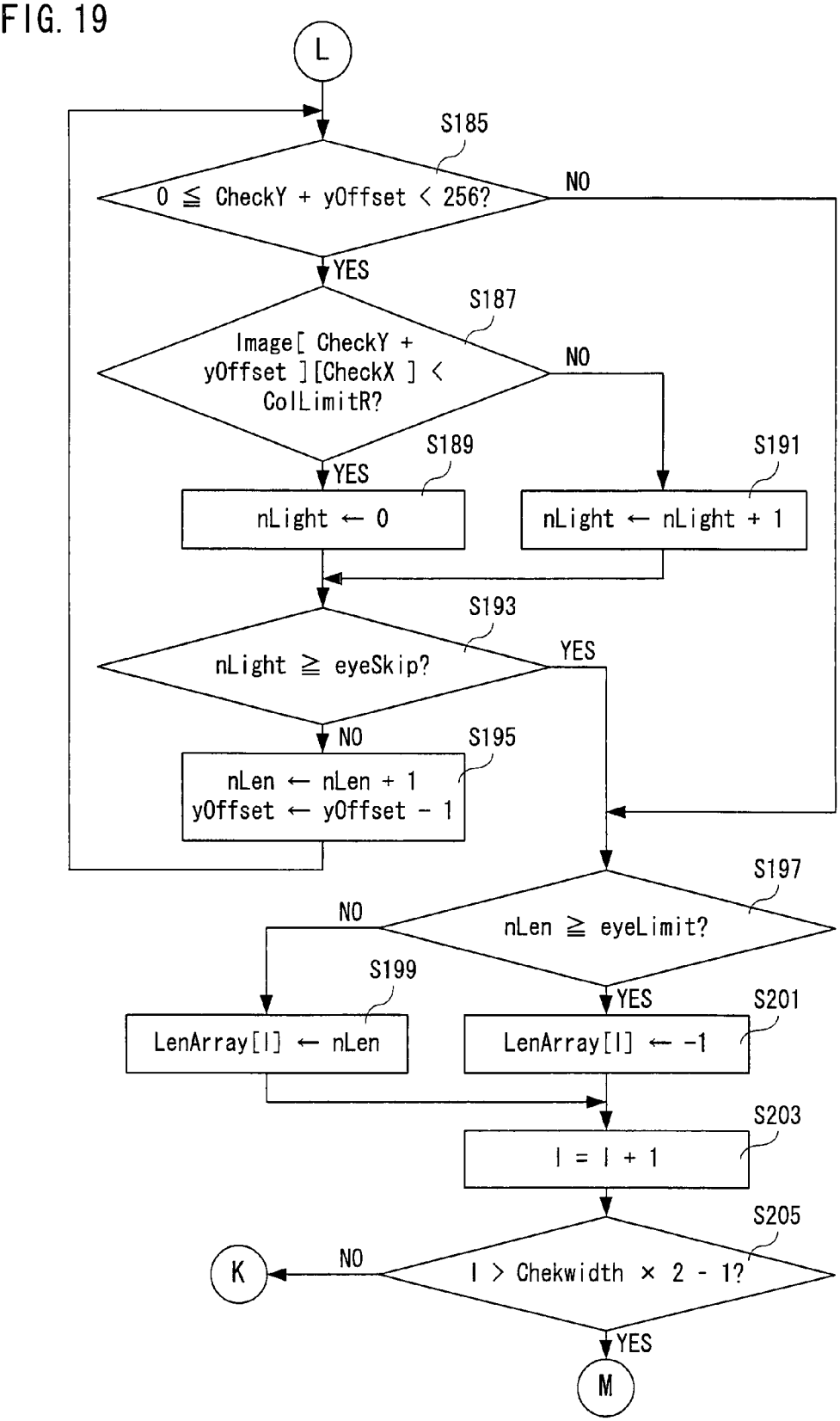
FIG. 19 is a flowchart continuing from FIG. 18 showing a eighth part of the area measuring processing of the CPU core shown in FIG. 2.
Figure 20:
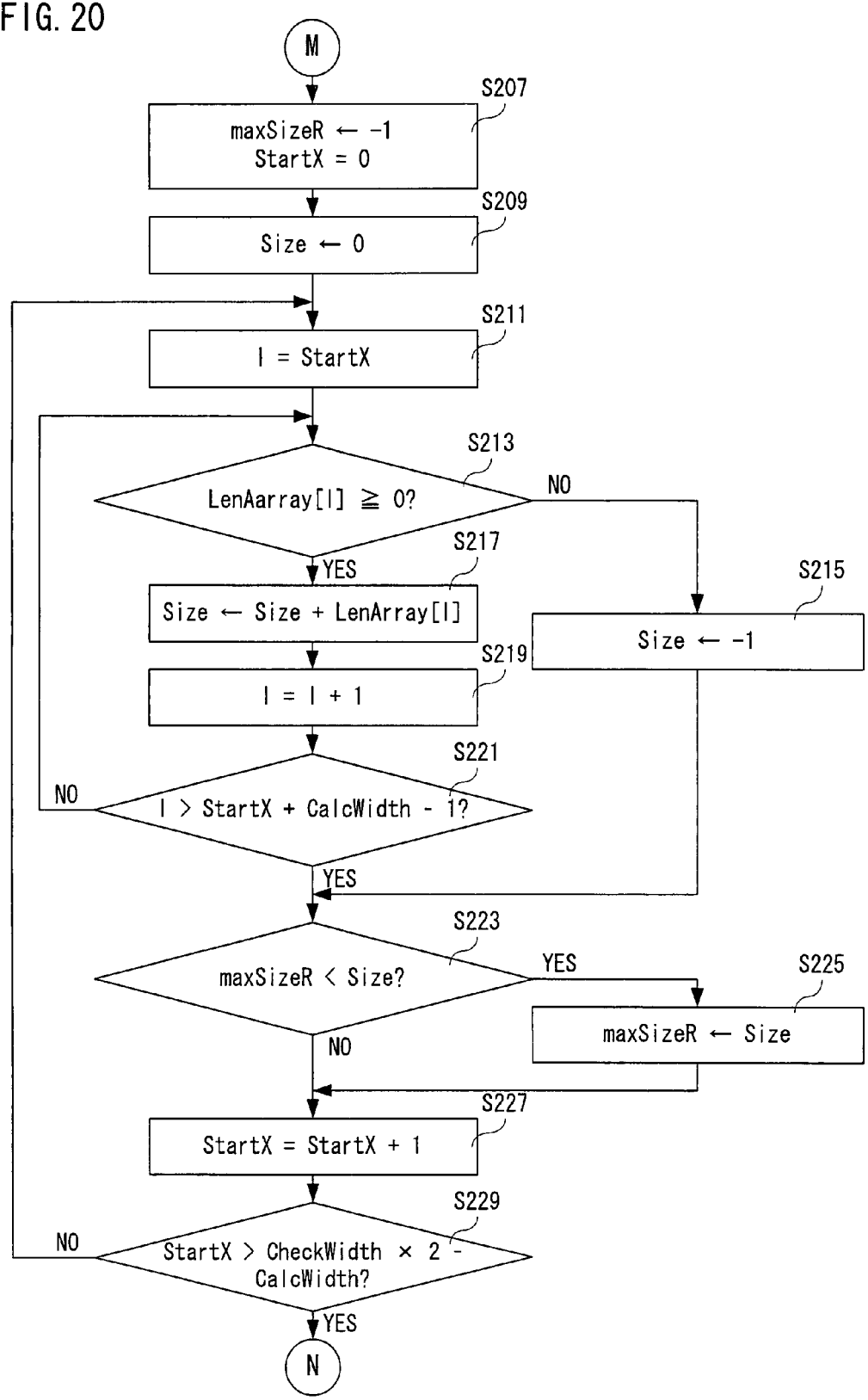
FIG. 20 is a flowchart continuing from FIG. 19 showing a ninth part of the area measuring processing of the CPU core shown in FIG. 2.

In a next step S169, an initial value (0) is set to each of the variables nLen, nLight and yOffset, and in a step S171 shown in FIG. 18, it is determined whether or not the foregoing Equation 6 is satisfied. That is, it is determined whether or not the variable CheckY is within the area scanning range. If "NO" in the step S171, that is, if Equation 6 is not satisfied, it is determined that the variable CheckY is out of the area scanning range, the process directly proceeds to a step S183. On the other hand, if "YES" in the step S171, that is, if Equation 6 is satisfied, it is determined that the variable CheckY is within the area scanning range, and it is determined whether or not Equation 17 is satisfied in a step S173. That is, it is determined whether the pixel value Image[CheckY+yOffset][CheckX] of the notable pixel (dot) is the black part or the white part.

$$\text{Image}[CheckY+yOffset][CheckX] < colLimitR \quad \text{[Equation 17]}$$

If "YES" in the step S173, that is, if Equation 17 is satisfied, it is determined that the notable pixel is the black part, the variable nLight is initialized (nLight=0) in a step S175, and the process proceeds to a step S179. On the other hand, if "NO" in the step S173, that is, if Equation 17 is not satisfied, it is determined that the notable pixel is the white part, the variable nLight is incremented (nLight←nLight+1) in a step S177, and the process proceeds to the step S179.

In the step S179, it is determined whether or not the foregoing Equation 8 is satisfied. That is, by determining whether or not it is equal to or more than a threshold value (variable eyeSkip) for regarding the number of white parts successively arranged in the vertical direction (variable nLight) as a black part, whether the white part except for the black eye or not is determined. If "NO" in the step S179, that is, if Equation 8 is not satisfied, the variable nLen is incremented (nLen←nLen+1), and the variable yOffset is incremented (yOffset←yOffset+1) in a step S181, and the process returns to the step S171. On the other hand, if "YES" in the step S179, that is, if Equation 8 is satisfied, it is determined to be the white part except for the black eye, the variable nLingt is initialized (nLingt←0) in order to scan the pixels at the lower part of the area scanning range, the variable nLight is initialized (inLight←0), and the variable yOffset is initialized (yOffset←−1) in the step S183. In a step S185 shown in FIG. 19, it is determined whether or not the foregoing Equation 6 is satisfied. That is, it is determined whether or not the variable CheckY is within the area scanning range.

If "NO" in the step S185, that is, if Equation 6 is not satisfied, the process directly proceeds to a step S197. On the other hand, if "YES" in the step S185, that is, if Equation 6 is satisfied, it is determined whether or not the foregoing Equation 17 is satisfied in a step S187. That is, it is determined whether or not the notable pixel is the black part or the white part. If "YES" in the step S187, that is, if Equation 16 is satisfied, it is determined that the notable pixel is the black part, the variable nLight is initialized (nLight=0) in a step S189, and the process proceeds to a step S193. On the other hand, if "NO" in the step S187, that is, if Equation 16 is not satisfied, it is determined that the notable pixel is the white part, the variable nLight is incremented (nLight←nLight+1) in a step S191, and the process proceeds to the step S193.

In the step S193, it is determined whether or not the foregoing Equation 8 is satisfied. That is, it is determined whether the notable pixel is the white part except for the black eye or not. If "NO" in the step S193, that is, if Equation 8 is not satisfied, the variable nLen is incremented (nLen←nLen+1) and the variable yOffset is decremented (yOffset←yOffset−1) in a step S195, and the process returns to the step S185. That is, search as to whether the black eye part or not is performed on the next pixel. On the other hand, if "YES" in the step S193, that is, if Equation 8 is satisfied, it is determined to be the white part except for the black eye, and the process proceeds to the step S197.

In the step S197, it is determined whether or riot the foregoing Equation 9 is satisfied. If "NO" in the step S197, that is, if Equation 9 is not satisfied, it is determined to be the black eye part, the value of variable nLen is substituted in the variable LenArrey[I] in a step S199, and the process proceeds to a step S203. On the other hand, if "YES" in the step S197, that is, if Equation 9 is satisfied, it is determined to be the black part except for the black eye, −1 (invalid value) is substituted in the variable LenArrey[I] in a step S201, and the process proceeds to the step S203.

In the step S203, the variable I is incremented (I=I+1). Then, in a step S205, it is determined whether or not the foregoing Equation 10 is satisfied. That is, it is determined whether or not the entire area scanning range is scanned. If "NO" in the step S205, that is, if Equation 10 is not satisfied, the process returns to the step S165 in FIG. 17 in order to scan the next line. On the other hand, if "YES" in the step S205, that is, if Equation 10 is satisfied, it is determined that the entire area scanning range is scanned, and in a step S207 shown in FIG. 20, the variable maxSizeR is initialized (maxSizeR←−1) and the variable StartX is initialized (StartX=0). Succeedingly, in a step S209, the variable Size is initialized (Size←0), and in a step S211, the variable StartX is substituted in the variable I.

Then, in a step S213, it is determined whether or not the foregoing Equation 11 is satisfied. That is, it is determined whether or not the variable LenArray[I] is not invalid. If "NO" in the step S213, that is, if Equation 11 is not satisfied, an invalid value (−1) is substituted in the variable Size in a step S215, and the process proceeds to a step S223. On the other hand, if "YES" in the step S213, that is, if Equation 11 is satisfied, Size+LenArray[I] is substituted in the variable Size in a step S217, the variable I is incremented (I=I+1) in a step S219, and the process proceeds to a step S221. In the step S221, it is determined whether or not the foregoing Equation 12 is satisfied.

If "NO" in the step S221, that is, if Equation 12 is not satisfied, the process returns to the step S213. On the other hand, if "YES" in the step S221, that is, if Equation 12 is satisfied, the process proceeds to a step S223. In the step S223, it is determined whether or not Equation 18 is satisfied.

$$\text{maxSizeR} < \text{Size} \quad \text{[Equation 18]}$$

If "YES" in the step S223, that is, if Equation 18 is satisfied, the variable Size is substituted in the variable maxSizeR in a step S225, and the process proceeds to a step S227. On the other hand, if "NO" in the step S223, that is, if Equation 18 is not satisfied, the variable StartX is incremented (StartX=StartX+1) in a step S227. Then, in a step S229, it is determined whether or not the foregoing Equation 14 is satisfied. That is, it is determined whether or not the variable StartX is out of the range to be scanned.

If "NO" in the step S229, that is, if Equation 14 is not satisfied, the process returns to the step S211. On the other hand, if "YES" in the step S229, that is, if Equation 14 is satisfied, it is determined whether or not the variable maxSize is less than 0 in a shown in a step S231 shown in FIG. 21. If "YES" in the step S231, that is, if the variable maxSize is less than 0, the process directly returns to the wink detecting processing shown in FIG. 9. On the other hand, if "NO" in the step S231, that is, if the variable maxSize is equal to or more than 0, the variable maxSizeR is normalized in a step S233 and the process then return to the wink detecting processing. It should be noted that the normalization of the variable maxSizeR is similar to that of the foregoing variable maxSizeL, and specifically, the variable maxSizeR is normalized according to Equation 19.

$$\text{maxSize}R = \text{maxSize}R/\text{EyeDistance}/\text{EyeDistance} \quad \text{[Equation 19]}$$

According to the present embodiment, the sizes of the black eye regions of the right and left eye are compared, so that it is possible to confirm a closing motion of one eye. Furthermore, the sizes of the black eye regions are merely compared, so that it is possible to reduce a processing load.

In this embodiment, the areas of the black eye regions are compared as one example, but it is not restricted thereto. For example, the lines which are made up with the longest successive black parts within the black eye regions may be compared between the left eye and the right eye. Furthermore, numerical values (areas and maximum lengths in the vertical direction) indicating the sizes of the white eye regions of the right and left eyes may be compared.

Furthermore, although the areas of the black eye regions are compared in this embodiment as one example, the same is true for the case that the area (area including irises and pupils) may be other colors (brown, blue, etc.). That is, in this specification, the black eye region includes a case that it is a color except for black.

In addition, by utilizing a gray-scale image of the photographed image, the area of the black eye region is measured to thereby detect a wink in this embodiment, but a color image may be used. In such a case, for example, a boundary between a white eye region and a black eye region or a boundary between eye regions and skin is detected by the difference in color, and from the difference in length of the border between the black eye region and the white eye region between the right and left eyes and the difference in size between the right and left eye regions, a wink may be detected.

In addition, although the camera cartridge is detachably attached to the game apparatus in this embodiment, it may fixedly be attached to the game apparatus. Or, face image data may be received from a camera separately provided from the game apparatus. In such a case, the game apparatus and the camera are connected by a short distance radio, or connected by a cable, for example.

Although the embodiments presented herein have been described and illustrated in detail, it is clearly understood that the same is by way of illustration and example only and is not to be taken by way of limitation, the spirit and scope of the present embodiments being limited only by the terms of the appended claims.

What is claimed is:

1. A non-transitory storage medium storing an information processing program executed by a computer of an information processing apparatus having a photographing element, and capturing a facial image of a user by said photographing element, said information processing program causes said computer to:

calculate respective eye region values indicating sizes of regions of right and left eyes from the facial image of the user photographed by said photographing element; and determine whether or not one eye is closed by comparing the calculated eye region values with respect to the right and left eyes.

2. The non-transitory storage medium storing an information processing program according to claim 1, wherein
said one eye determining determines whether or not one eye is closed depending on ratios of the eye region values to said respective right and left eyes.

3. The non-transitory storage medium storing an information processing program according to claim 1, wherein
said information processing program further causes said computer to set search regions to said respective right and left eyes, and said eye region value calculating calculates said eye region values from the respective search regions with respect to said set right and left eyes.

4. The non-transitory storage medium storing an information processing program according to claim 3, wherein
said eye region value calculating includes calculating black eye region values indicating sizes of black eye regions of the respective right and left eyes from the facial image of the user photographed by said photographing element.

5. The non-transitory storage medium storing an information processing program according to claim 4, wherein
said information processing program causes said computer to further acquire feature points of the right and left eyes from the facial image of the user photographed by said photographing element, and
said search region setting sets the respective search regions with respect to said right and left eyes by utilizing the acquired feature points of the right and left eyes.

6. The non-transitory storage medium storing an information processing program according to claim 5, wherein
said information processing program causes said computer to further calculate black eye reference values from the respective search regions with respect to said set right and left eyes, and
said black eye region value calculating calculates said black eye region values by regarding the calculated black eye reference values as threshold values.

7. The non-transitory storage medium storing an information processing program according to claim 6, wherein
said black eye reference values are values relating to brightness in the respective set search regions with respect to said right and left eyes.

8. The non-transitory storage medium storing an information processing program according to claim 6, wherein
said black eye reference value calculating step sets said black eye reference values by utilizing at least any one of the darkest color and the brightest color within the entire search region set by said search region setting step.

9. The non-transitory storage medium storing an information processing program according to claim 4, wherein
said information processing program causes said computer to further perform gray-scaling the facial image of the user photographed by said photographing element, and
said black eye region value calculating calculates eye region values from the facial image gray-scaled by said gray-scaling.

10. The non-transitory storage medium storing an information processing program according to claim 9, wherein said information processing program further causes said computer to set search regions to said respective right and left eyes, and said eye region value calculating calculates said eye region values from the respective set search regions with respect to said right and left eyes.

11. The non-transitory storage medium storing an information processing program according to claim 10, wherein said eye region value calculating includes calculating black eye region values indicating sizes of black eye regions of the respective right and left eyes from the facial image of the user photographed by said photographing element.

12. The non-transitory storage medium storing an information processing program according to claim 11, wherein said information processing program causes said computer to further acquire feature points of the right and left eyes from the gray-scaled facial image, and said search region setting sets the respective search regions with respect to said right and left eyes by utilizing the acquired feature points of the right and left eyes.

13. The non-transitory storage medium storing an information processing program according to claim 12, wherein said information processing program causes said computer to further calculate black eye reference values from the respective set search regions with respect to said right and left eyes, and said black eye region value calculating calculates said black eye region values by regarding the calculated black eye reference values as threshold values.

14. The non-transitory storage medium storing an information processing program according to claim 12, wherein said search region setting sets the respective search regions with respect to said right and left eyes regarding the acquired feature points of the right and left eyes as centers.

15. The non-transitory storage medium storing an information processing program according to claim 5, wherein said search region setting sets the respective search regions with respect to said right and left eyes regarding the acquired feature points of the right and left eyes step as centers.

16. The non-transitory storage medium storing an information processing program according to claim 5, wherein said information processing program causes said computer to further calculate a distance between the acquired feature points of the right and left eyes, and said search region setting sets the respective search regions with respect to the right and left eyes by utilizing the calculated distance between the feature points of the right and left eyes.

17. The non-transitory storage medium storing an information processing program according to claim 16, wherein said information processing program causes said computer to further normalize the calculated black eye region values by utilizing the calculated distance between the feature points of the right and left eyes, and said one eye determining determines whether or not one eye is closed by comparing the normalized black eye region values with respect to the right and left eyes.

18. The non-transitory storage medium storing an information processing program according to claim 7, wherein said black eye region value calculating includes setting a darkest pixel as a first direction reference value by scanning in a first direction of the set search region, and calculating the number of pixels being successively aligned from said first direction reference value and being darker than the black eye reference value, wherein the number of calculated dark pixels is regarded as said black eye region value.

19. The non-transitory storage medium storing an information processing program according to claim 18, wherein said black eye region value calculating includes pixel count adding for repetitively executing said first direction reference value setting and said pixel count calculating by shifting on a pixel by pixel basis in a second direction orthogonal to said first direction, and adding the number of pixels being successively aligned from said first direction reference value and being darker than the black eye reference value, and the number of dark pixels added by said pixel count adding is regarded as said black eye region value.

20. The non-transitory storage medium storing an information processing program according to claim 18, wherein said black eye region value calculating sets an invalid value as said black eye region value when the number of pixels being successively aligned from said first direction reference value and being darker than the black eye reference value by said pixel count calculating reaches above a predetermined number.

21. The non-transitory storage medium storing an information processing program according to claim 20, wherein, said feature point acquiring, said search region calculating, said black eye reference value calculating, and said black eye region value calculating are repetitively executed by said computer at least twice, and said information processing program causes said computer to execute said one eye determining only when an invalid value is not successively set to said black eye region value.

22. The non-transitory storage medium storing an information processing program according to claim 18, wherein said pixel count calculating sets, when a pixel brighter than said black eye reference value is successively aligned by a predetermined number or more, the number from said first direction reference value to the bright pixel as said black eye region value.

23. The non-transitory storage medium storing an information processing program according to claim 1, wherein said information processing program causes said computer to further execute a predetermined process in a case that it is determined that one eye is closed by said one eye determining.

24. An information processing apparatus having a photographing element, and capturing a facial image of a user by said photographing element, said information processing apparatus comprising at least one computer processor configured to:

calculate respective eye region values indicating sizes of regions of right and left eyes from the facial image of the user photographed by said photographing element; and determine whether or not one eye is closed by comparing the calculated eye region values with respect to the right and left eyes.

25. An information processing method of an information processing apparatus having a photographing element and capturing a facial image of a user by said photographing element, said information processing method comprising:

(a) calculating respective eye region values indicating sizes of regions of right and left eyes from the facial image of the user photographed by said photographing element; and (b) determining whether or not one eye is closed by comparing the eye region values with respect to the right and left eyes calculated by step (a).

26. A game system comprising:

a controller operated by a player;

a display screen displaying a game image; a a photographing element, wherein a facial image of the user is captured by said photographing element; and at least one computer processor configured to:

calculate respective eye region values indicating sizes of regions of right and left eyes from the facial image of the user photographed by said photographing element; and determine whether or not one eye is closed by comparing the calculated eye region values with respect to the right and left eyes.

* * * * *